(12) United States Patent      (10) Patent No.: US 7,237,230 B2
Underseth et al.      (45) Date of Patent: Jun. 26, 2007

(54) SYSTEM AND METHOD FOR GENERATING DATA SETS FOR TESTING EMBEDDED SYSTEMS

(75) Inventors: Mark Underseth, Carlsbad, CA (US); Kirk Fertitta, San Diego, CA (US); Robert Howell, San Diego, CA (US)

(73) Assignee: S2 Technologies, Inc., Cardiff, CA (US)

( * ) Notice: Subject to any disclaimer, the term of this patent is extended or adjusted under 35 U.S.C. 154(b) by 582 days.

(21) Appl. No.: 10/105,069

(22) Filed: Mar. 22, 2002

(65) Prior Publication Data

US 2002/0198675 A1    Dec. 26, 2002

Related U.S. Application Data

(60) Provisional application No. 60/363,436, filed on Mar. 11, 2002, provisional application No. 60/299,555, filed on Jun. 19, 2001, provisional application No. 60/278,212, filed on Mar. 23, 2001.

(51) Int. Cl.
*G06F 9/44* (2006.01)

(52) U.S. Cl. ............ 717/127; 717/124; 717/131

(58) Field of Classification Search ........ 717/124–161; 714/38; 709/315
See application file for complete search history.

(56) References Cited

U.S. PATENT DOCUMENTS

| | | | |
|---|---|---|---|
| 5,510,749 A | 4/1996 | Arimoto | |
| 5,600,790 A | 2/1997 | Barnstijn et al. | |
| 5,649,131 A | 7/1997 | Ackerman et al. | |
| 5,794,047 A | 8/1998 | Meier | |
| 5,867,153 A | 2/1999 | Grandcolas et al. | |
| 5,872,909 A | 2/1999 | Wilner et al. | |
| 5,978,902 A | 11/1999 | Mann | |
| 6,002,868 A * | 12/1999 | Jenkins et al. | 717/105 |
| 6,014,638 A | 1/2000 | Burge et al. | |
| 6,029,181 A | 2/2000 | Milakovich et al. | |
| 6,038,604 A | 3/2000 | Bender et al. | |
| 6,066,181 A | 5/2000 | DeMaster | |
| 6,070,189 A | 5/2000 | Bender et al. | |
| 6,275,871 B1 | 8/2001 | Reinfelder et al. | |

(Continued)

FOREIGN PATENT DOCUMENTS

WO     WO 98/15091     4/1998

OTHER PUBLICATIONS

Makuta et al., "Automatic Programming by Design Specification Database for Communication Software," IEEE, pp. 480-486, 1989.

(Continued)

*Primary Examiner*—Chuck O. Kendall
(74) *Attorney, Agent, or Firm*—Knobbe Martens Olson & Bear, LLP

(57) ABSTRACT

A system and method for providing seamless communication with threads executing on an embedded computer. Using a DAT system, a programmer can test the communication interfaces of a thread via either a scripting program, any COM-compliant program, or a graphical test utility. The DAT system automatically formats a block of data that is transmitted between the embedded computer and a host computer and accounts for machine specific enumeration sizes, machine specific pointer sizes, machine specific structure alignment boundaries, machine specific integer sizes, and machine specific byte ordering.

24 Claims, 39 Drawing Sheets

U.S. PATENT DOCUMENTS

| | | | |
|---|---|---|---|
| 6,279,123 B1 | 8/2001 | Mulrooney | |
| 6,279,124 B1 | 8/2001 | Brouwer et al. | |
| 6,418,439 B1 | 7/2002 | Papierniak et al. | |
| 6,421,730 B1 | 7/2002 | Narad et al. | |
| 6,430,570 B1 | 8/2002 | Judge et al. | |
| 6,473,794 B1 | 10/2002 | Guheen et al. | |
| 6,505,342 B1 | 1/2003 | Hartmann et al. | |
| 6,507,877 B1* | 1/2003 | Ross | 710/53 |
| 6,546,477 B1 | 4/2003 | Russo et al. | |
| 6,546,553 B1 | 4/2003 | Hunt | |
| 6,681,386 B1 | 1/2004 | Amin et al. | |
| 6,721,942 B1 | 4/2004 | Sievert | |
| 6,807,667 B1 | 10/2004 | Bar et al. | |
| 6,832,381 B1 | 12/2004 | Mathur et al. | |
| 6,865,599 B2 | 3/2005 | Zhang | |
| 6,892,328 B2 | 5/2005 | Klein et al. | |
| 6,938,246 B2* | 8/2005 | Alford et al. | 717/128 |
| 7,013,345 B1 | 3/2006 | Brown et al. | |
| 2001/0025372 A1 | 9/2001 | Vermeire et al. | |
| 2002/0032803 A1 | 3/2002 | Marcos et al. | |
| 2002/0059560 A1* | 5/2002 | Phillips | 717/124 |
| 2002/0188595 A1 | 12/2002 | Underseth et al. | |
| 2002/0198887 A1 | 12/2002 | Underseth | |
| 2002/0198893 A1 | 12/2002 | Underseth et al. | |
| 2002/0198922 A1 | 12/2002 | Underseth et al. | |
| 2002/0199035 A1 | 12/2002 | Christensen et al. | |
| 2003/0061292 A1 | 3/2003 | Underseth et al. | |
| 2004/0205719 A1* | 10/2004 | Hooper et al. | 717/124 |
| 2005/0080905 A1 | 4/2005 | Dolinar et al. | |
| 2005/0102687 A1 | 5/2005 | Mathur et al. | |
| 2005/0183072 A1* | 8/2005 | Horning et al. | 717/140 |
| 2005/0257191 A1 | 11/2005 | Underseth et al. | |
| 2006/0179427 A1 | 8/2006 | Underseth et al. | |
| 2006/0212880 A1 | 9/2006 | Underseth et al. | |

OTHER PUBLICATIONS

Dmitri, "Spying on COM Objects," Windows Developer's Journal, pp. 1-14, Jul. 1999.

O'Malley, et al., "USC: A Universal Stub Compiler," SIGCOMM 94-8/94 London England UK, ACM, ISSN: 0146-4833, 1994, pp. 295-306.

Shields et al., "KHIP—A Scalable Protocol for Secure Multicast Routing," SIGCOMM '99 8/99 Cambridge, MA, ACM, ISBN: 1-58113-135-6, 1999, pp. 53-64.

Office Action dated Nov. 19, 2004 from U.S. Appl. No. 10/104,997 (STECINC.003A).

Office Action dated May 31, 2005 from U.S. Appl. No. 10/104,997 (STECINC.003A).

Current claim set of U.S. Appl. 10/104,997(STECINC.003A).

Office Action dated Jun. 6, 2005 from U.S. Appl. 10/105,061 (STECINC.008A).

Current claim set of U.S. Appl. 10/105,061 (STECINC.008A).

Office Action dated May 16, 2005 from U.S. Appl. 10/104,989 (STECINC.010A).

Office Action dated Nov. 1, 2005 from U.S. Appl. 10/104,989 (STECINC.010A).

Current claim set of U.S. Appl. 10/104,989 (STECINC.010A).

Office Action dated May 27, 2005 from U.S. Appl. 10/104,985 (STECINC.011A).

Current claim set of U.S. Appl. 10/104,985 (STECINC.011A).

Office Action dated Jun. 14, 2005 from U.S. Appl. 10/105,062 (STECINC.012A).

Current claim set of U.S. Appl. 10/105,062 (STECINC.012A).

Coulouris, et al., "Distruited Systems Concepts and Design", Second Edition, Addison-Wesley, 1994, pp. 100-108, 165-166, 603-608.

Hunt, et al. Intercepting and Instrumenting COM Applications, Publications in: Proceedings of the 5th conference on Object-Oriented Technologies and Systems, pp. 45-56, May 1999, retrieved from http://research.microsoft.com/~galenh/Publications/HuntCoots99.pdf on Jun. 22, 2006.

* cited by examiner

FIG. 4

| FIG. 4A |
|---------|
| FIG. 4B |

STRIDE AUTOSCRIPT EXAMPLES

```
Send And Read
1   ...
2       // create a reference to the User Message Object
3       var msg = db.UserMyTwoWayMsg;
4
5       // access the command payload
6       msg.MyCmdPayload.FieldA = 335;
7
8       // send the command and wait for the response
9       msg.SendAndRead;
10
11      // retrieve response data
12      var result = msg.MyRspPayload.FieldB;
```
/ 404

```
Subscribing to Broadcasts
1   ...
2       // create a reference to the User Message Object.
3       var msg = db.UserMyBroadcastMsg;
4
5       msg.Subscribe;
6
7       msgRead = ascript.Read;
8
9       // process broadcast data
10      var result = msgRead.MyBcastPayload.Field B;
11  ...
```
/ 408

FIG. 4A

```
Function Call Example
12   ...
13     // create a reference to the User Function Object
14     var func = db.UserMyFunction;
15
16     func.ParameterList.x = 5;
17     func.ParameterList.y = 10;
18
19     func.Call( );
20
21     // process return data
22     var result = func.ReturnVal;
23   ...
```
⟶ 412

```
Function Call Example
24   ...
25     // create a reference to the Owner Function Object.
26     var func = db.OwnerMyFunction;
27
28     // register as owner of the service.
29     func.Register;
30
31     // wait for a call
32     func = func.Read ( );
33
34     // access the parameter list
35     var x = func.ParameterList.x;
36
37     // setup the return value
38     func.ReturnValue = 15;
39
40     // return from the call
41     func.Return ( );
42   ...
```
⟶ 416

FIG. 4B

```
typedef struct       typedef struct
{                    {
   int a;               int t;                  typedef struct
   long b;              long v;                 { int*c;
} MessageA           } MessageTwoWayCmd         } MessageTwoWayRsp;
```
/* 3200 */

```
void MessageThread ( );
{
   Register (MessageA);
   ...
loop
< msg:Read;
   Switch (msg);
   {
      case MessageA;
      {   //todo::perform work;
          printf (perform work);
      }
      ...
      case MessageTwoWay;
      {
          //todo:perform work and fill out rsp;
          SendMessageTwoWayRsp ( );
      }
      ...
}
```
/* 3204 */

```
Send MessageTwoWayCmd ( )
{
   MessageTwoWayCmd val;
   //todo:[for developer to complete]
   Send Cmd (val);}

Send MessageTwoWayRsp ( ){
   MessageTwoWayRsp val;
   //todo fill values of val variable;
   Setuppointers ( );
   Attachpointers ( );
   Send Rsp (val);}
```
/* 3208 */

FIG. 32

```
int    dowork (long value);
```

```
Remote
int    dowork (long value)
{
    Setup_pointers ( );
    Attach_pointers ( );
    Send Cmd (value);
    msg:Read ( );
    return msg;
}
```
⟵ 3212

```
Local
Void Function Thread;
{
    Register;
    msg:Read;
    switch (msg);
    {
        case dowork;
            int rsp = dowork (value);
            Setup_pointers ( );
            Attach_pointers ( );
            send rsp (rsp);
        case • • •
    }
}
```
⟵ 3214

FIG. 33

SYSTEM AND METHOD FOR GENERATING DATA SETS FOR TESTING EMBEDDED SYSTEMS

RELATED APPLICATIONS

This application claims priority to, and incorporates by reference, in their entirety, the following applications: U.S. Provisional Application No. 60/278,212, filed Mar. 23, 2001, titled "SYSTEM FOR DEBUGGING AND TRACING THE PERFORMANCE OF SOFTWARE TARGETED FOR EMBEDDED SYSTEMS" and U.S. Provisional Application No. 60/299,555, filed Jun. 19, 2001, titled "MESSAGING SYSTEM AND PROCESS", and U.S. Provisional Application No. 60/363,436, filed Mar. 11, 2002, titled "DEVELOPMENT AND TESTING SYSTEM AND METHOD."

This application is related to and incorporates by reference in their entirety, the following commonly owned patent applications that have been filed on even date herewith: U.S. patent application Ser. No. 10/105,061, titled "SYSTEM AND METHOD FOR FORMATTING DATA FOR TRANSMISSION BETWEEN AN EMBEDDED COMPUTER AND A HOST COMPUTER HAVING DIFFERENT MACHINE CHARACTERISTICS"; U.S. patent application Ser. No. 10/104,989, titled "SYSTEM AND METHOD FOR BUILDING A DATABASE DEFINING A PLURALITY OF COMMUNICATION INTERFACES"; U.S. patent application Ser. No. 10/104,985, titled "SYSTEM AND METHOD FOR PROVING AN INTERFACE FOR SCRIPTING PROGRAMS TO COMMUNICATE WITH EMBEDDED SYSTEMS"; U.S. patent application Ser. No. 10/105,062, titled "SYSTEM AND METHOD FOR PROVIDING AN INTERFACE FOR COM-COMPLIANT APPLICATIONS TO COMMUNICATE WITH EMBEDDED SYSTEMS"; and U.S. patent application Ser. No. 10/104,997, titled "SYSTEM AND METHOD FOR AUTOMATICALLY GENERATING CODE TEMPLATES FOR COMMUNICATION VIA A PREDEFINED COMMUNICATION INTERFACE".

BACKGROUND OF THE INVENTION

1. Field of the Invention

The field of the invention relates to development and testing. More particularly, the field of the invention relates to the development and testing of software.

2. Description of the Related Technology

An embedded device typically includes a microprocessor and application software. The application software runs under the control of a real-time operating system (RTOS) and is typically partitioned into one or more threads. A thread is an independent unit of executable software that shares the control of the microprocessor with other defined threads within the embedded system. In many embedded devices, a thread is allocated its own stack space, given a "priority", and assigned other resources that enable the thread to run as an "independent" entity. Stack space is a section of memory reserved for temporary storage of local variables. Priorities are used by the RTOS to determine which thread gets control of the microprocessor if more than one thread is waiting. Resources can include miscellaneous items such as queues, flags, etc., that are required by the RTOS to manage a thread. Other common terms used for a thread are "task" and "process." A process also implies a separate address space which protects different processes from adversely affecting each other. An example of a process running on a desktop computer using Microsoft's Windows Operating System (OS) is Microsoft Word.

A common method for threads to communicate with each other is via a messaging application programming interface (API) that is provided by the operating system. A message typically includes an event and optionally a block of data that is sent between at least two threads. For example, a thread ("the sender") builds a message and invokes a specific API from the RTOS. The RTOS notifies the other thread ("the receiver") that some type of event has occurred. The receiving thread then reads the incoming message. Another common method for threads to communicate is via a function call. Using a function call provided by one thread can be invoked by another thread. Likewise functions can be called by other functions that co-exist in the same thread. Other common terms for a function include a subroutine, a procedure, or a method. As used herein, the term "communication interface" is intended to embrace any interface for communicating data between two threads, such as via either messaging or remote function call communication.

There are several problems associated with known development and testing systems for embedded devices as described above. First, known testing systems require the use of the embedded device that has an operational RTOS to test the communication interfaces of the threads and to test the execution of the threads themselves. Disadvantageously, known systems do not have the ability to simulate communication interfaces and the corresponding threads that support them.

Second, when using more than one platform to host running threads, there is a compatibility problem representing interfaces on different machines. Different types of machines store messages differently in their respective memory space. Known testing systems do not automatically format data for transmission to different platforms. An example of incompatibility between two computers is when one computer stores a 16-bit integer (2 bytes) with the least significant byte in low memory (Little Endian) and the other computer stores the least significant byte in high memory (Big Endian). When the applications want to exchange this 16-bit integer, the value of the integer is interpreted differently depending on the computer.

Third, known systems require the creation of a custom desktop tool that can communicate with the embedded software. The process of building interface functionality for a specific embedded application is a time consuming and manual process. The desktop tool and the embedded software both require manual updates to their application to enable them to communicate with each other. Thus, there is no seamless and automatic access via a desktop tool to the interfaces for an embedded software application.

Fourth, desktop applications developed in other programming languages that are incompatible with standard C/C++ interface definition files cannot interact with the embedded computer seamlessly. Typically, interface definition files define the format of the messages expected by the embedded software. Languages such as Visual Basic, LabVIEW, etc., cannot use standard C interface definition files that define the format of the interfaces. Thus, software engineers that use these languages cannot test the threads executing on the embedded device.

Thus, there is a need for improved devices for development and testing of embedded software that do not have the foregoing limitations.

SUMMARY OF THE INVENTION

One aspect of the invention comprises a system for testing a thread executing on an embedded computer. The system comprises: a host computer; a first thread executing on the host computer; and an embedded computer executing a thread. The embedded computer monitors a plurality of communications that are sent to the thread and transmits data from the monitored communications to the host computer. The host computer stores the data from the monitored communications in a plurality of data sets.

Another aspect of the invention comprises a method of testing a thread. The method comprises monitoring a plurality of communications that are sent to a thread that is executing on an embedded computer; transmitting the monitored communications to a host computer; storing the monitored communications in a plurality of data sets; and transmitting at least one of the data sets to the monitored thread.

Yet another aspect of the invention comprises a method of testing a thread, the method comprising: monitoring a plurality of communications from a first thread to a second thread, wherein the communication comprise a plurality of data elements; storing each of the communications in a data set; and transmitting each of the stored data elements to the first thread.

BRIEF DESCRIPTION OF THE DRAWINGS

FIGS. 4A and 4B are a diagram of an exemplary script that can be used to communicate with the embedded computer of FIG. 3.

FIG. 32 is a block diagram illustrating exemplary generated code.

FIG. 33 is a block diagram illustrating exemplary generated code.

DETAILED DESCRIPTION OF CERTAIN EMBODIMENTS OF THE INVENTION

The following detailed description is directed to certain specific embodiments of the invention. However, the invention can be embodied in a multitude of different ways as defined and covered by the claims. In this description, reference is made to the drawings wherein like parts are designated with like numerals throughout.

Figure 1:
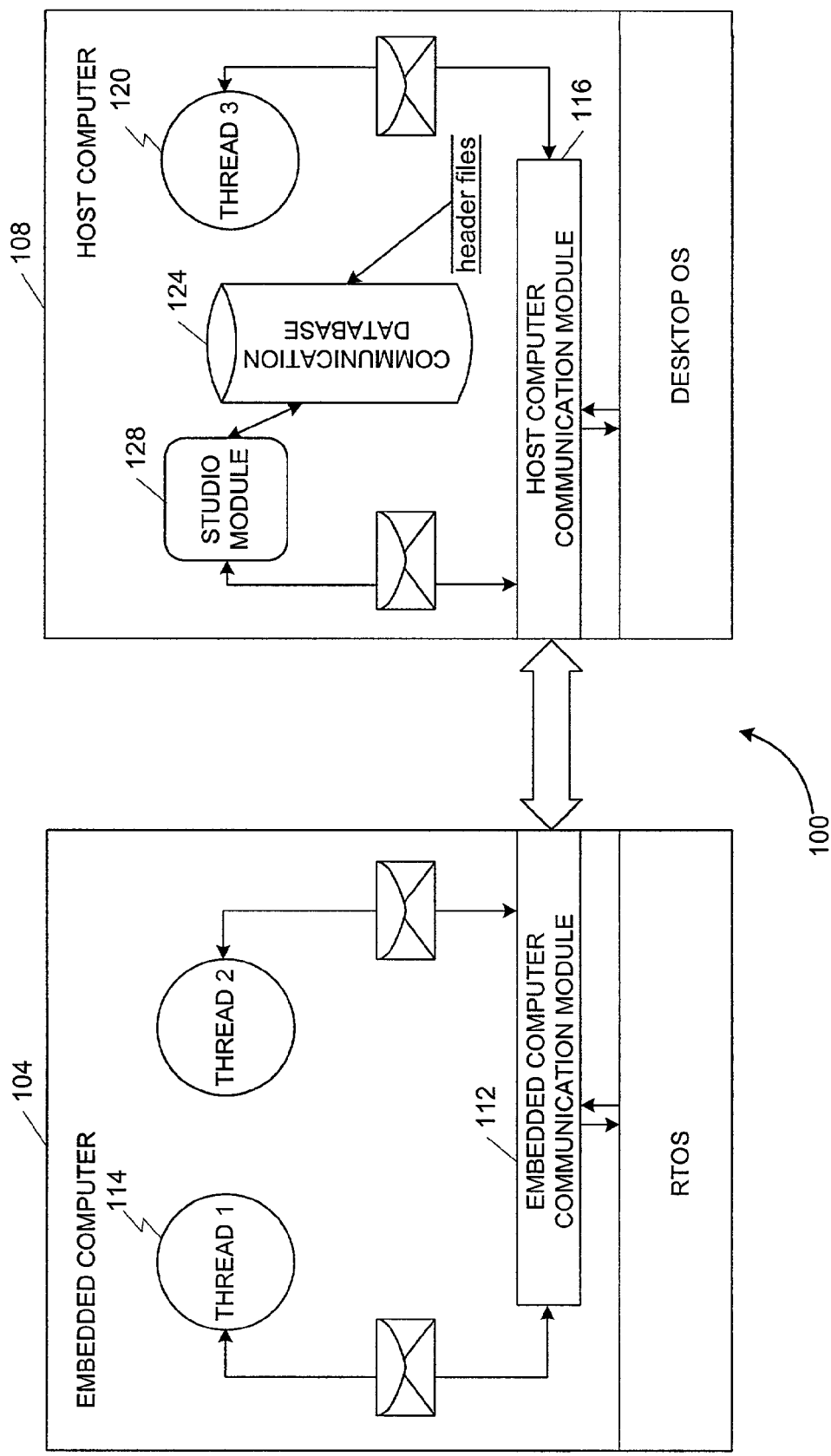
FIG. 1 is a block diagram illustrating a development and testing system for testing an embedded computer.

FIG. 1 is a block diagram illustrating one embodiment of a DAT system 100. The development and testing ("DAT") system 100 allows developers to have automatic and seamless access to their defined communication interfaces. In addition, the DAT system 100 enables threads to run on distributed platforms, and allows any programming language seamless access to the interfaces.

The DAT system 100 comprises an embedded computer 104 that is in data communication with a host computer 108.

The embedded computer 104 executes an embedded computer communication module 112 that is used to route communications to threads 114 executing on the embedded computer 104. The host computer 108 executes a host computer communication module 116 that is used to route messages to threads 120 executing on the host computer 108. The embedded computer communication module 112 and the host computer communication module 116 are able to route to each other messages and/or other communications sent via other interfaces originating from one platform that are destined for transmission to the other platform. In one embodiment of the invention, all communications from one platform to the other platform are transmitted via the embedded computer communication module 112 and the host computer communication module 116.

The embedded computer 104 can reside on a telephone, a card on a peripheral device, an automobile, a refrigerator, or any other electronic device. The host computer 108 can include any computing device that includes a display and an input device, e.g., mouse, keyboard.

The host computer 116 also comprises a communication database 124 that automatically compiles the embedded and host's interface definition files to capture the "characteristics" of a communication interface.

The DAT system 100 provides a standardized API for messaging and tracing, contains a protocol suite used to implement a seamless messaging and tracing environment, and implements the communication link between the two platforms. In one embodiment of the invention, the API that is provided by the DAT system 100 includes interfaces for the following: (i) registering a message; (ii) reading a message; (iii) sending command data; (iv) sending response data; (v) broadcasting a message; (vi) subscribing to a message; (vii) returning the list of messages stored in the communication database; (viii) returning the message format of a specific message; and (ix) returning the name and/or identifier of a specific message. Further exemplary API of the DAT system 100 are described below.

A studio module 128 provides a graphical user interface and testing environment for testing the communication interfaces that are identified by the communication database 124. The DAT system 100 provides complete visibility and control of all the messages and remote function calls defined by an embedded software application. As an example, using the studio module 128, a developer can scan the entire list of messages and/or remote function calls within the database and display them on a screen. Once a specific message or remote function call is selected, the communication database 124 can be queried to return the element types and names associated with the message.

Upon execution, each of the threads in the embedded computer 104 and the host computer 108 register with the DAT system 100. Registration enables the DAT system 100 to dynamically route messages without having to "hard-code" a routing table. Threads at anytime can call a specific application programming interface "API" that is offered by the DAT system 100 to inform the DAT system 100 that the requesting thread "owns" a selected message. Owns, in this context, means that the specific thread receives the message anytime another thread and or application sends it. When a request to send a message is issued, the DAT system 100 determines whether the owning thread is local or on the other platform. If the platform is local, the message is directly routed to the owning thread. If the platform is remote, the message is directly routed to the other platform. If the message originates at the embedded computer 104, upon receipt, the host computer 108 formats the message to be compatible with the machine characteristics of the host computer 108. If the message originates at the host computer 108, the host computer 108 formats the messages to be compatible with the machine characteristics of the embedded computer 104.

The embedded computer communication module 112, the host computer communication module 116, and the studio module 128 each comprise various sub-routines, procedures, definitional statements, and macros. The computer communication module 112, the host computer communication module 116, and the studio module 128 may be written in any programming language such as C, C++, BASIC, Java, Pascal, and Fortran and may be run under the well-known operating system. C, C++, BASIC, Pascal, Java, and Fortran are industry standard programming languages for which many commercial compilers can be used to create executable code.

The embedded computer 104 may execute under the control of any off-the-shelf or proprietary real-time operating system such as: VxWorks, Nucleus, ThreadX, Windows CE, RTXC, and Embedded Linux.

The host computer 108 may execute under the control of any off-the-shelf or proprietary operating system, such as: UNIX, LINUX, Disk Operating System (DOS), OS/2, PalmOS, VxWorks, Windows 3.X, Windows 95, Windows 98, Windows NT, Windows CE, and Windows XP. Each of the threads on embedded computer 104 and the host computer 108 can communication respectively with the embedded computer communication module 112 and the host computer communication module 116 via a predefined application programming interface API. Set forth below are described certain routines provided by the API. It is to be appreciated that other routines may also be provided.

| Application Programming Interfaces |  |
|---|---|
| Methods |  |
| Owner Methods |  |
| Broadcast | Broadcasts a response to all subscribed Users. (Broadcast message type only) |
| Read Command | Reads the Command sent by a User (One-way & Two-way message types only) |
| Register | Registers ownership of the service associated with the message (One-way & Two-way message types only) |
| Send Response | Sends the response. (Two-way message type only) |
| Un-register | Un-registers ownership of the service. (One-way & Two-way message types only) |
| User Methods |  |
| Read Response | Reads the Response sent from the owner. (Two-way and Broadcast message types only) |
| Send and Read | Combines the Send Command and Read Response methods (Two-way message type only) |
| Send Command | Sends the Command to the registered Owner (One-way and Two-way message types only) |
| Subscribe | Subscribes to the service associated with the Message. Once subscribed the Message object will receive all broadcasts sent by any owner of the service. (Broadcast message type only) |
| Un-subscribe | Un-subscribes to the service. |
| Spy API |  |
| Read Command | Reads (spies on) a copy of a command sent from a User to the Register Owner |
| Read Response | Reads (spies on) a copy of a Response sent from the Owner to the User |
| Register | Register as a spy of the interface to thereafter receive copies of all Commands and Responses sent |

-continued

Application Programming Interfaces

| Methods | |
|---|---|
| | by Owners and Users of the Service. |
| Un-register | Un-register the object as a spy |
| <Dataset methods> | Defined below |

Owner Functions API

| | |
|---|---|
| Register | Registers ownership of the service associated with the function |
| Read Parameter List | Reads the Parameter List sent by the Caller |
| Return | Sends the Return Value to the Caller (User). |
| Un-register | Un-registers ownership of the function. |
| <Dataset methods> | Defined below |

User Function API

| | |
|---|---|
| Call | Calls the remote function with the Object's Parameter List |
| Read Return Value | Reads the Return Value returned by the Owner. |

Spy Function API

| | |
|---|---|
| Read Parameter List | Reads (spies on) a copy of the Parameter List sent by the Caller |
| Read Response | Reads (spies on) a copy of the Response sent from the Owner to the User |
| Register | Register the Object as spy of the interface to thereafter receive copies of all Calls and Returns made between users and owners of the function. |
| Un-register | Un-register the object as a spy. |
| <Dataset methods> | Defined below |

Datasets

| | |
|---|---|
| Clear All Datasets | Clears/Deletes all datasets associated with either the Command or Response (Messages), or Input or Output (Functions) |
| Delete Datasets | Deletes a specified number of datasets |
| Insert Datasets | Inserts a specified number of datasets. |
| Load Datasets | Loads datasets from the database and associates them with the interface object. |
| Store Datasets | Stores the datasets currently associated with the interface object into the database. |

Miscellaneous API

| | |
|---|---|
| Pointer Setup | Specify the attributes of a the pointer, e.g., IN, IN/OUT, OUT, pooled, private. |
| Pointer Attach | Invoked each time a pointer address or size is modified |

Figure 2:
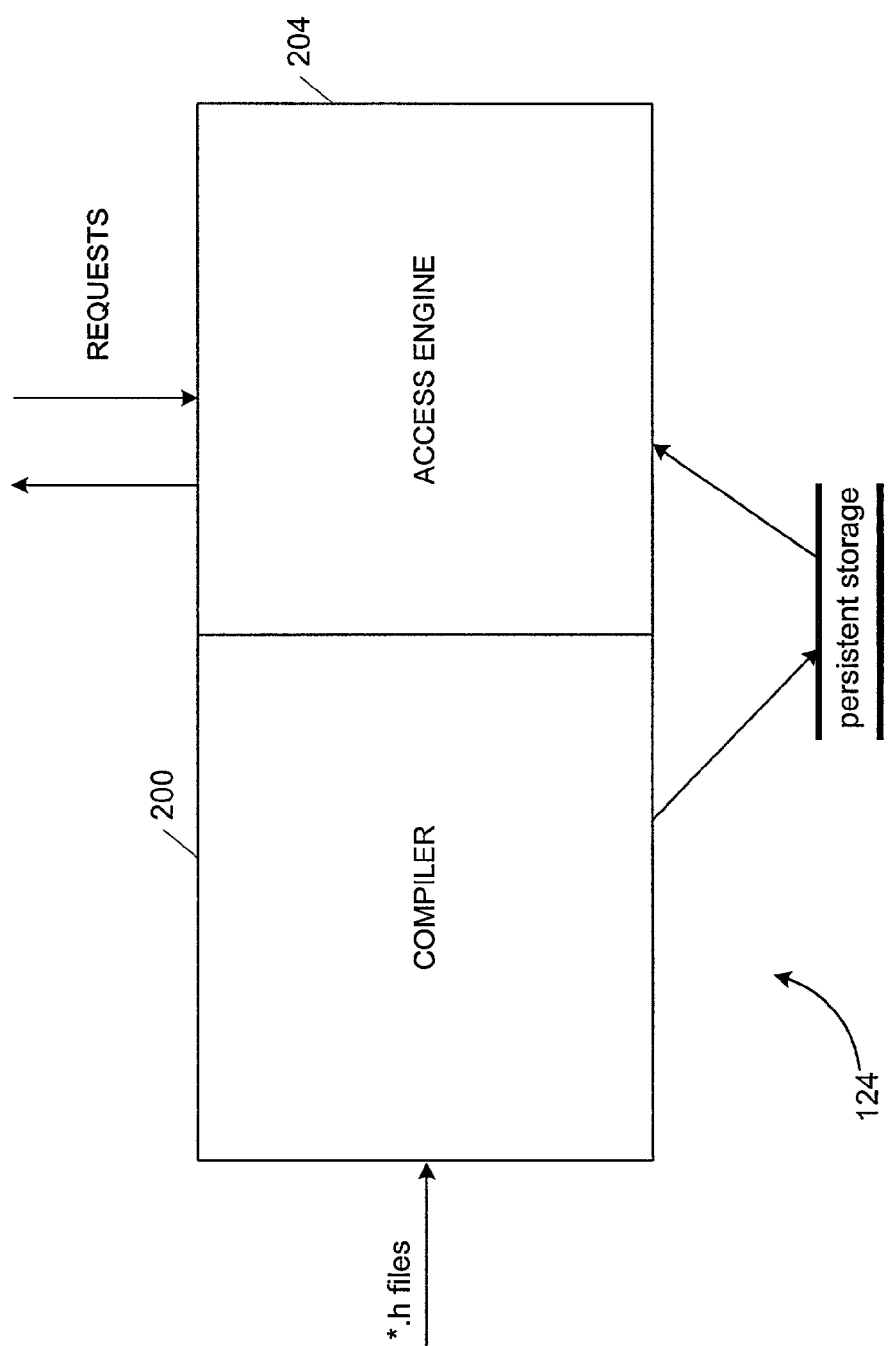
FIG. 2 is a block diagram illustrating certain components of a communication database that is part of the development and testing system of FIG. 1.

FIG. 2 presents a functional block diagram of the communication database 124. The communication database 124 includes a compiler 200 and an access engine 204. The communication database 124 parses standard interface definition files, such as in C, C++, or other programming language, and automatically extracts out the interface and tracing information. The interface definition files contain the formats of the interfaces that are used for thread communication and software tracing. In one embodiment of the invention, a programmer can define these characteristics in the interface definition file via the use of compiler pragmas.

The information from the interface definition files is organized and stored in the communication database 124 such that it that can be accessed by other desktop applications via the host computer communication module 116. An exemplary process of building the communication database 124 is described below with respect to FIG. 9.

In one embodiment of the invention, the DAT system 100 provides seamless and automatic ability for an application on the host computer 108 to make a remote function call to a routine that is on the embedded computer 104 and vice-versa, without requiring modification of the application other than to link the libraries and header files of the DAT system 100. An exemplary process of automatically generating code in support of a remote function call is described below with reference to FIG. 31.

Figure 3:
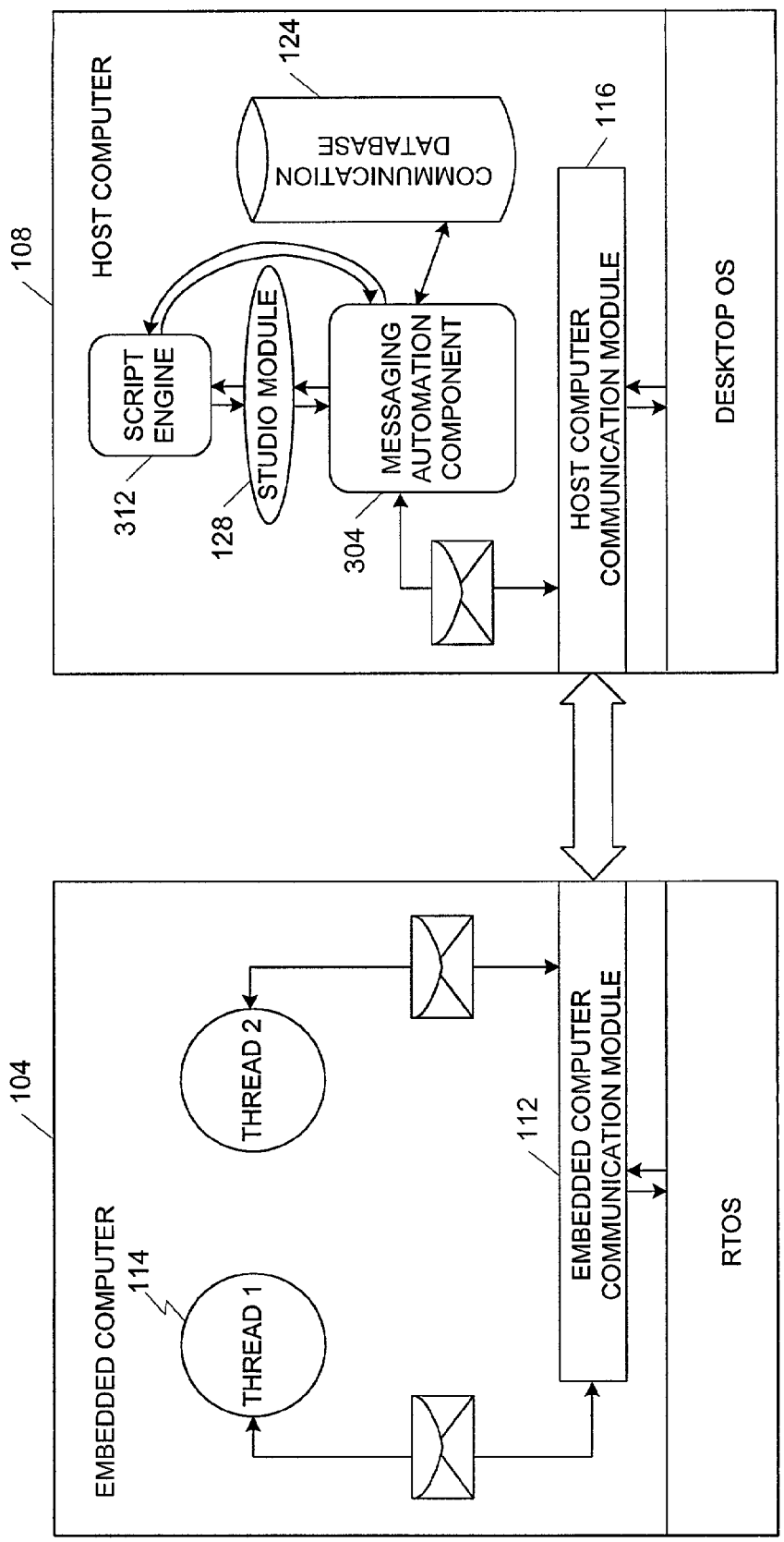
FIG. 3 is a block diagram illustrating another embodiment of the development and testing system of FIG. 1.

FIG. 3 is a block diagram illustrating another exemplary embodiment of the invention. The embodiment of the invention shown in FIG. 3 allows scripting languages to seamlessly access threads that are executing on the embedded computer 104 and the host computer 108.

With respect to the embodiment of the invention shown in FIG. 3, the DAT system 100 also comprises a messaging automation component ("MAC") 304 and a script engine 312 for executing a script. In one embodiment of the invention, the MAC 304 is a COM-compliant object that provides interfaces for performing the following functions: designating ownership of an interface, generating a data set, sending a field of information, sending a data set, receiving a message, and listing each of the messages that are managed by the DAT system 100. The script engine 312 can be any proprietary or off-the-shelf engine that supports scripting languages such as: JavaScript, Visual Basic, VBScript, Tcl, JScript, Python, etc.

Set forth below is a description of the various objects that are provided by the MAC 304 for communication. In one embodiment of the invention, there are 6 classes of interface objects: (i) owner message objects; (ii) user message objects; (iii) spy message objects; (iv) owner function objects; (v) user function objects; and (vi) spy function objects. It is to be appreciated that other type of objects may also be used.

The application programming interfaces of the MAC 304 are set forth below.

Owner Message Object

| Methods | |
|---|---|
| Broadcast | Broadcasts a response to all subscribed Users. (Broadcast message type only) |
| Read Command | Reads the Command sent by a User (One-way & Two-way message types only) |
| Register | Registers ownership of the service associated with the message (One-way & Two-way message types only) |
| Send Response | Sends the response. (Two-way message type only) |
| Un-register | Un-registers ownership of the service. (One-way & Two-way message types only) |
| <Dataset methods> | Defined below |

| Properties | |
|---|---|
| Name | Name of the Interface |
| SUID | STRIDE Unique Identifier for the Interface |
| Command Payload | Command payload of the Message Object. |
| Response Payload | Response payload of the Message Object. |
| Out Pointer Data | Out pointer data-defined as part of the Command payload, populated as apart of the Response. |
| <Dataset properties> | Defined below |

User Message Object

| Methods | |
|---|---|
| Read Response | Reads the Response sent from the owner. (Two-way and Broadcast message types only) |
| Send and Read | Combines the Send Command and Read Response methods (Two-way message type only) |
| Send Command | Sends the Command to the registered Owner (One-way and Two-way message types only) |
| Subscribe | Subscribes to the service associated with the Message. Once subscribed the Message object will receive all broadcasts sent by any owner of the service. (Broadcast message type only) |
| Un-subscribe | Un-subscribes to the service. |
| <Dataset methods> | Defined below |

-continued

| Properties | |
|---|---|
| Name | Name of the Interface |
| SUID | STRIDE Unique Identifier for the Interface |
| Command Payload | Command payload of the Message Object. |
| Response Payload | Response payload of the Message Object. |
| Out Pointer Data | Out pointer data-defined as part of the Command payload, populated as apart of the Response. |
| <Dataset properties> | Defined below |

Spy Message Object

| Methods | |
|---|---|
| Read Command | Reads (spies on) a copy of a command sent from a User to the Register Owner |
| Read Response | Reads (spies on) a copy of a Response sent from the Owner to the User |
| Register | Register as a spy of the interface to thereafter receive copies of all Commands and Responses sent by Owners and Users of the Service. |
| Un-register | Un-register the object as a spy |
| <Dataset methods> | Defined below |

| Properties | |
|---|---|
| Name | Name of the Interface |
| SUID | STRIDE Unique Identifier for the Interface |
| Command Payload | Command payload of the Message Object. |
| Response Payload | Response payload of the Message Object. |
| Out Pointer Data | Out pointer data-defined as part of the Command payload, populated as apart of the Response. |
| <Dataset properties> | Defined below |

Owner Function Object

| Methods | |
|---|---|
| Register | Registers ownership of the service associated with the function |
| Read Parameter List | Reads the Parameter List sent by the Caller |
| Return | Sends the Return Value to the Caller (User). |
| Un-register | Un-registers ownership of the function. |
| <Dataset methods> | Defined below |

| Properties | |
|---|---|
| Name | Name of the Interface |
| SUID | STRIDE Unique Identifier for the Interface |
| Parameter List | List of parameters for the Function Object. |
| Return Value | Return value for the Function Object. |
| Out Pointer Data | Out pointer data-defined as part of the Parameter List, populated as apart of the Output. |
| <Dataset properties> | Defined below |

User Function Object

| Methods | |
|---|---|
| Call | Calls the remote function with the Object's Parameter List |
| Read Return Value | Reads the Return Value returned by the Owner. |
| <Dataset methods> | Defined below |

| Properties | |
|---|---|
| Name | Name of the Interface |
| SUID | STRIDE Unique Identifier for the Interface |
| Parameter List | List of parameters for the Function Object. |
| Return Value | Return value for the Function Object. |
| Out Pointer Data | Out pointer data-defined as part of the Parameter List, populated as apart of the Output. |
| <Dataset properties> | Defined below |

Spy Function Object

| Methods | |
|---|---|
| Read Parameter List | Reads (spies on) a copy of the Parameter List sent by the Caller |
| Read Response | Reads (spies on) a copy of the Response sent from the Owner to the User |
| Register | Register the Object as spy of the interface to thereafter receive copies of all Calls and Returns made between users and owners of the function. |
| Un-register | Un-register the object as a spy. |
| <Dataset methods> | Defined below |

| Properties | |
|---|---|
| Name | Name of the Interface |
| SUID | STRIDE Unique Identifier for the Interface |
| Parameter List | List of parameters for the Function Object. |
| Return Value | Return value for the Function Object. |
| Out Pointer Data | Out pointer data-defined as part of the Parameter List, populated as apart of the Output. |
| <Dataset properties> | Defined below |

Datasets

| Methods | |
|---|---|
| Clear All Datasets | Clears/Deletes all datasets associated with either the Command or Response (Message Objects), or Input or Output (Function Objects) |
| Delete Datasets | Deletes a specified number of datasets |
| Insert Datasets | Inserts a specified number of datasets. |
| Load Datasets | Loads datasets from the database and associates them with the interface object. |
| Store Datasets | Stores the datasets currently associated with the interface object into the database. |

In one embodiment, for message objects, datasets are sets of data associated with either the command (command payload) or response (response payload and out pointer data). One-way messages have command datasets, broadcast messages have response datasets, and two-way messages have both. For function objects, datasets are associated with either the input (parameter list) and/or the output (return value and out pointer data).

Scripting languages allow developers to customize, automate testing, and add macro capabilities. Scripting languages, in general, are easy to use for this type of functionality. Scripting languages also contain much of the same capability found in compiled languages such as loops, conditional statements, etc. A script program is text written in a script language that is executed by a script engine. The messaging automation component 304 provides a script program seamless and instant access to the communication interfaces of each of the threads in the embedded computer 104 and the host computer 108. Using the messaging automation component 304, fields in a message or parameters in a remote function call can be set, read, tested against, or used in expressions. Via the messaging automation component 304, the scripting program can also transmit and receive communications seamlessly with software running on either an embedded computer 104 or the host computer 108. Furthermore, establishing such communication does not require code changes of the threads executing on either the embedded computer 104 and/or the host computer 108.

In one embodiment of the invention, the script program is launched via an interface that is provided by the studio module 128. In another embodiment of the invention, the script program does not have to be launched by the studio module 128, but instead, can be launched and communicate directly with the host computer communication module 116.

FIGS. 4A and 4B illustrate exemplary scripts that can execute in the script engine 312 to communicate with one of the threads 114 that are executing on the embedded computer 104 and/or the host computer 108. Code block 404 illustrates exemplary code that may be used to send a two way message. On line 3 of code block 404, the script sets an object "msg" equal to one of the messages that is maintained in the communication database 124. At line 6, the script sets a field in a payload that is associated with the message. As is known in the art, a payload is structured data. At line 9, the script sends a command message and waits for a response. At line 11, the script retrieves the response data. Code block 408 illustrates exemplary code that may be used to subscribe to a broadcast. Code block 412 illustrates exemplary code that may be used to invoke a function. Code block 416 illustrates exemplary code that may be used to register ownership of a function.

Figure 5:
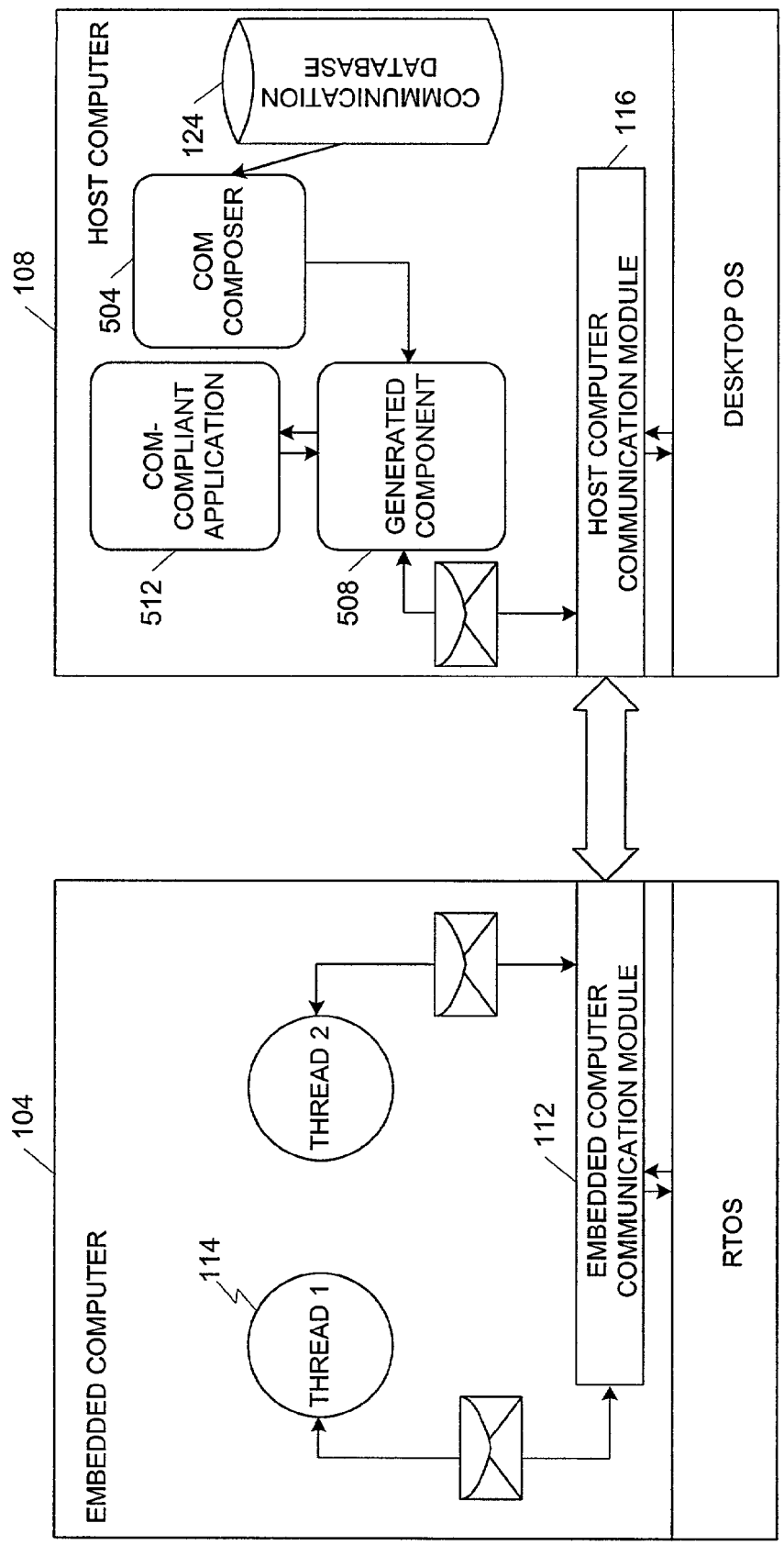
FIG. 5 is a block diagram illustrating another embodiment of the development and testing system of FIG. 1.

FIG. 5 is a block diagram illustrating another embodiment of the invention. A COM composer 504 automatically builds a generated component 508 that serves as an interface between a COM-compliant application 512 and the host computer communication module 116. COM is a Microsoft technology that enables different applications to communicate with each other using a known interface, independent of the languages that the applications were developed in. For compatibility purposes, COM specifies the particular format and protocol of the interfaces.

The generated component 508 provides the COM-compliant application 512 seamless and instant access to the communication interfaces of an embedded application through predefined API. Using the generated component 508, the COM-compliant application 512 seamlessly communicates with threads executing on the embedded computer 104 and the host computer 108. The host computer communication platform 116 automatically formats communication in a form suitable for its destination. An exemplary process of formatting a communication is described below with reference to FIG. 11.

Set forth below is a description of the application programming interfaces that are provided by the generated component 508.

Owner Message Object

Methods

| | |
|---|---|
| Broadcast | Broadcasts a response to all subscribed Users. (Broadcast message type only) |
| Read Command | Reads the Command sent by a User (One-way & Two-way message types only) |
| Register | Registers ownership of the service associated with the message (One-way & Two-way message types only) |
| Send Response | Sends the response. (Two-way message type only) |
| Un-register | Un-registers ownership of the service. (One-way & Two-way message types only) |
| <Dataset methods> | Defined below |

Properties

| | |
|---|---|
| Name | Name of the Interface |
| SUID | STRIDE Unique Identifier for the Interface |
| Command Payload | Command payload of the Message Object. |
| Response Payload | Response payload of the Message Object. |
| Out Pointer Data | Out pointer data-defined as part of the Command payload, populated as apart of the Response. |
| <Dataset properties> | Defined below |

User Message Object

Methods

| | |
|---|---|
| Read Response | Reads the Response sent from the owner. (Two-way and Broadcast message types only) |
| Send and Read | Combines the Send Command and Read Response methods (Two-way message type only) |
| Send Command | Sends the Command to the registered Owner (One-way and Two-way message types only) |
| Subscribe | Subscribes to the service associated with the Message. Once subscribed the Message object will receive all broadcasts sent by any owner of the service. (Broadcast message type only) |
| Un-subscribe | Un-subscribes to the service. |
| <Dataset methods> | Defined below |

Properties

| | |
|---|---|
| Name | Name of the Interface |
| SUID | STRIDE Unique Identifier for the Interface |
| Command Payload | Command payload of the Message Object. |
| Response Payload | Response payload of the Message Object. |
| Out Pointer Data | Out pointer data-defined as part of the Command payload, populated as apart of the Response. |
| <Dataset properties> | Defined below |

Spy Message Object

Methods

| | |
|---|---|
| Read Command | Reads (spies on) a copy of a command sent from a User to the Register Owner |
| Read Response | Reads (spies on) a copy of a Response sent from the Owner to the User |
| Register | Register as a spy of the interface to thereafter receive copies of all Commands and Responses sent by Owners and Users of the Service. |
| Un-register | Un-register the object as a spy |
| <Dataset methods> | Defined below |

Properties

| | |
|---|---|
| Name | Name of the Interface |
| SUID | STRIDE Unique Identifier for the Interface |
| Command Payload | Command payload of the Message Object. |
| Response Payload | Response payload of the Message Object. |
| Out Pointer Data | Out pointer data-defined as part of the Command payload, populated as apart of the Response. |
| <Dataset properties> | Defined below |

Owner Function Object

Methods

| | |
|---|---|
| Register | Registers ownership of the service associated with the function |
| Read Parameter List | Reads the Parameter List sent by the Caller |
| Return | Sends the Return Value to the Caller (User). |
| Un-register | Un-registers ownership of the function. |
| <Dataset methods> | Defined below |

Properties

| | |
|---|---|
| Name | Name of the Interface |
| SUID | STRIDE Unique Identifier for the Interface |
| Parameter List | List of parameters for the Function Object. |
| Return Value | Return value for the Function Object. |
| Out Pointer Data | Out pointer data-defined as part of the Parameter List, populated as apart of the Output. |
| <Dataset properties> | Defined below |

User Function Object

Methods

| | |
|---|---|
| Call | Calls the remote function with the Object's Parameter List |
| Read Return Value | Reads the Return Value returned by the Owner. |
| <Dataset methods> | Defined below |

Properties

| | |
|---|---|
| Name | Name of the Interface |
| SUID | STRIDE Unique Identifier for the Interface |
| Parameter List | List of parameters for the Function Object. |
| Return Value | Return value for the Function Object. |
| Out Pointer Data | Out pointer data-defined as part of the Parameter List, populated as apart of the Output. |
| <Dataset properties> | Defined below |

Spy Function Object

Methods

| | |
|---|---|
| Read Parameter List | Reads (spies on) a copy of the Parameter List sent by the Caller |
| Read Response | Reads (spies on) a copy of the Response sent from the Owner to the User |
| Register | Register the Object as spy of the interface to thereafter receive copies of all Calls and Returns made between users and owners of the function. |

-continued

| | |
|---|---|
| Un-register | Un-register the object as a spy. |
| <Dataset methods> | Defined below |
| Properties | |
| | |
| Name | Name of the Interface |
| SUID | STRIDE Unique Identifier for the Interface |
| Parameter List | List of parameters for the Function Object. |
| Return Value | Return value for the Function Object. |
| Out Pointer Data | Out pointer data-defined as part of the Parameter List, populated as apart of the Output. |
| <Dataset properties> | Defined below |
| | Datasets |
| Methods | |
| | |
| Clear All Datasets | Clears/Deletes all datasets associated with either the Command or Response (Message Objects), or Input or Output (Function Objects) |
| Delete Datasets | Deletes a specified number of datasets |
| Insert Datasets | Inserts a specified number of datasets. |
| Load Datasets | Loads datasets from the database and associates them with the interface object. |
| Store Datasets | Stores the datasets currently associated with the interface object into the database. |

It is noted, that in one embodiment, the MAC 304, the studio module 128, the generated component 508, can be utilized together to provide a communication system for various types of applications. For example, using the application programming interface of the MAC 304, a scripting program in a first language can communicate with a scripting program in the same or a second language, a COM-compliant application 512 via the generated component 508, a thread executing on the embedded computer 104, a thread executing on the host computer 108, and the studio module 128.

Furthermore, for example, using the application programming interface of the generated component 508, a COM-compliant application can communicate with a scripting program via the MAC 304, another COM-compliant application, a thread executing on the embedded computer 104, a thread executing on the host computer 108, and the studio module 128.

Furthermore, for example, using the studio 128, a user can send and receive messages to and from the COM-compliant application 512, a scripting program, a thread executing on the host computer 108, a thread executing on the embedded computer 104.

Figure 6:
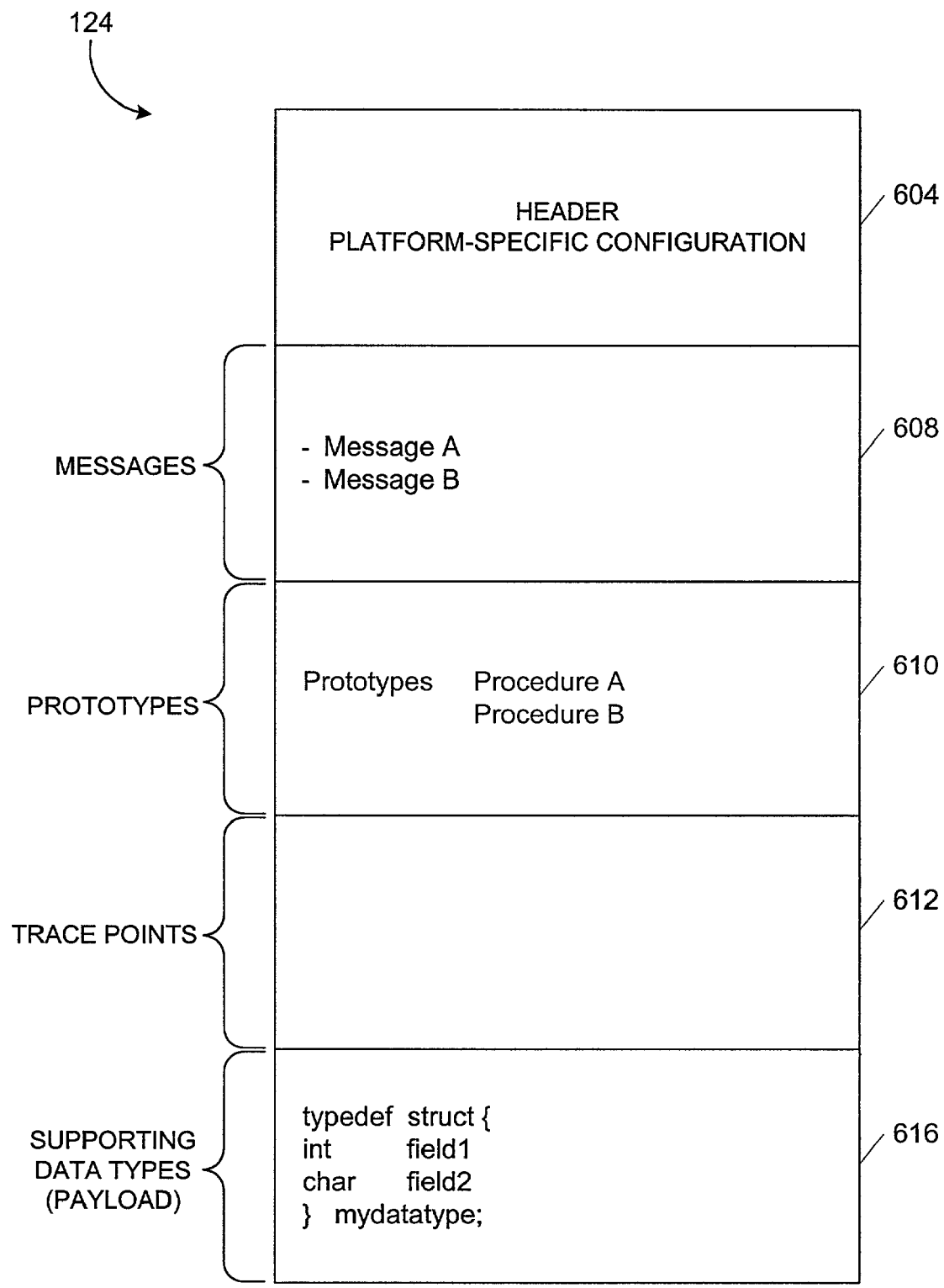
FIG. 6 is a block diagram illustrating the exemplary contents of the communication database of FIG. 1.

FIG. 6 is a representational block diagram illustrating one embodiment of the communication database 124. Depending on the embodiment, additional types of information may be added to the database and/or certain types of information may be omitted.

The communication database 124 includes a platform-specific configuration section 604. The platform-specific configuration section 604 contains embedded computer machine characteristics and host computer machine characteristics. The characteristics can include items, such as: an indication of whether the platform is big or little Endian, enumeration sizes, pointer sizes, structure alignment boundaries, etc. It is noted that in one embodiment of the invention, the embedded computer machine characteristics and the host computer machine characteristics are stored in a location other than the communication database 124, such as the host computer communication module 116 or the embedded computer 104.

The communication database 124 also includes a messages section 608 and a prototypes section 610. The messages section 608 and the prototypes section 610 respectively describe the characteristics of each of the messages and remote function calls on the embedded computer 104 and the host computer 108. The characteristics can include: (i) the unique name and or identifier of the message; (ii) the total size of the message; (iii) the type of the communication, e.g., one-way message, two-way message, broadcast message, remote function call; and (iv) the types of data are passed as part of the communication. A one way message is sent from a "user" of the communication to the "owner" of the communication. A thread can request ownership of a message via a registration routine that is provided via an application programming interface of the host computer communication module 116. A two way message comprises a "command" that is sent from the user to the owner and a "response" that is sent from the owner to the user. A broadcast message is sent to all threads that have registered to receive the broadcast.

The communication database 124 also includes a trace points section 612 for maintaining trace points. The communication database 124 also includes a description of the data types that are supported by the messages identified in the messaging section 608 and the functions listed in the prototypes section 610.

The data types section 616 includes: (i) a description of the data types in the data structures that are part of a message or remote function call, e.g., integer, character, Boolean, floating-point, arrays, etc; (ii) the field name of each of the elements in each of the messages; (iii) and a description of characteristics of embedded pointers that may be part of the message.

Figure 7:
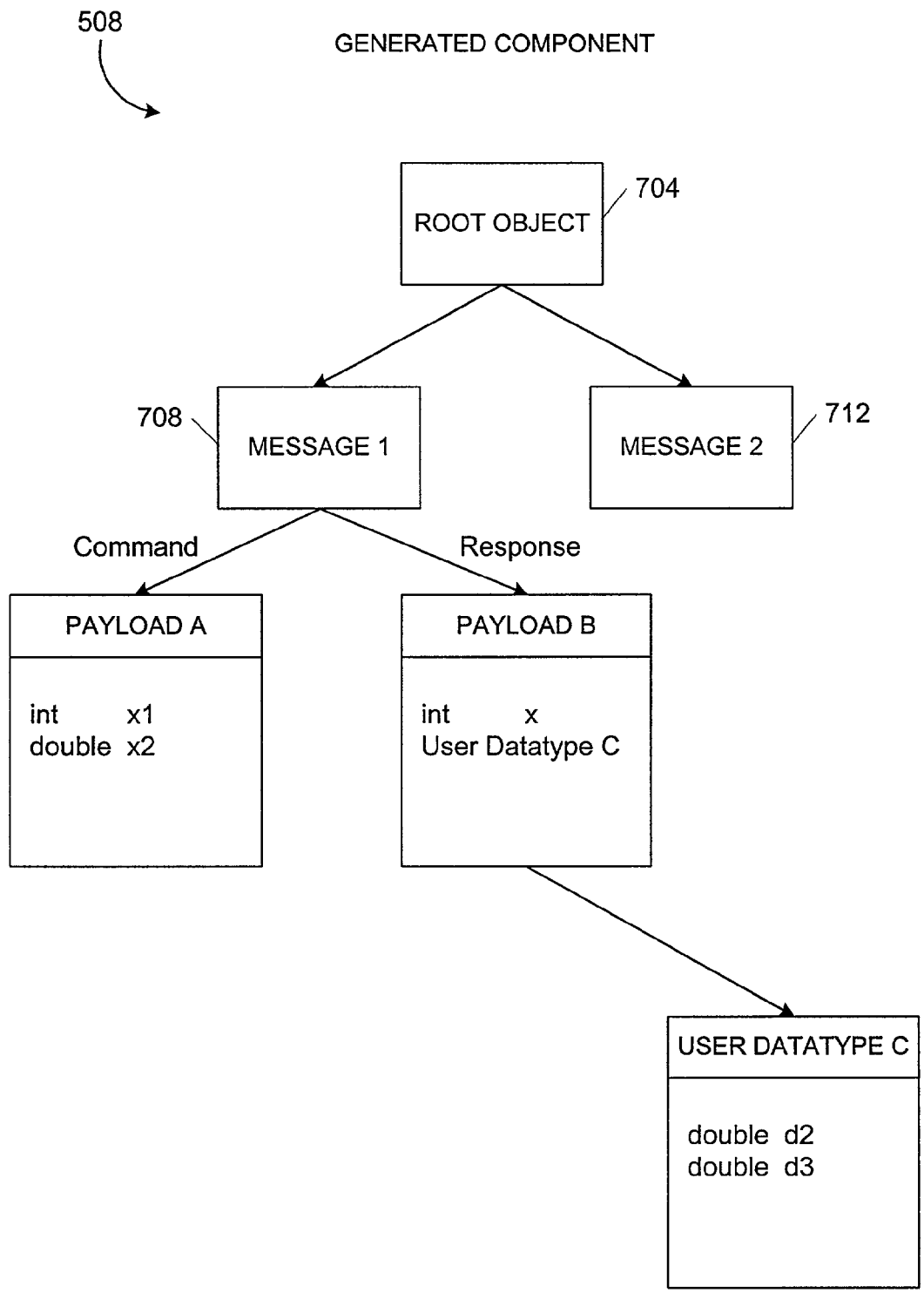
FIG. 7 is a block diagram illustrating an exemplary object hierarchy of the generated component of FIG. 5.

FIG. 7 is a block diagram illustrating an exemplary component hierarchy of the generated component 508. The COM-compliant object 512 initially accesses the generated component 508 via a root object 704. Via the root object 704, the COM-compliant object 512 can send commands and receive responses from particular messages and remote function calls that are defined in the communication database 124. For example, as is shown in FIG. 7, the COM-compliant object has access to an object 708 that is associated with "MESSAGE 1" and an object 712 that is associated with "MESSAGE 2." Using predefined interfaces associated with these message objects, the COM-compliant object 512 can send and receive payloads with threads that are executing on the embedded computer 104.

Figure 8:
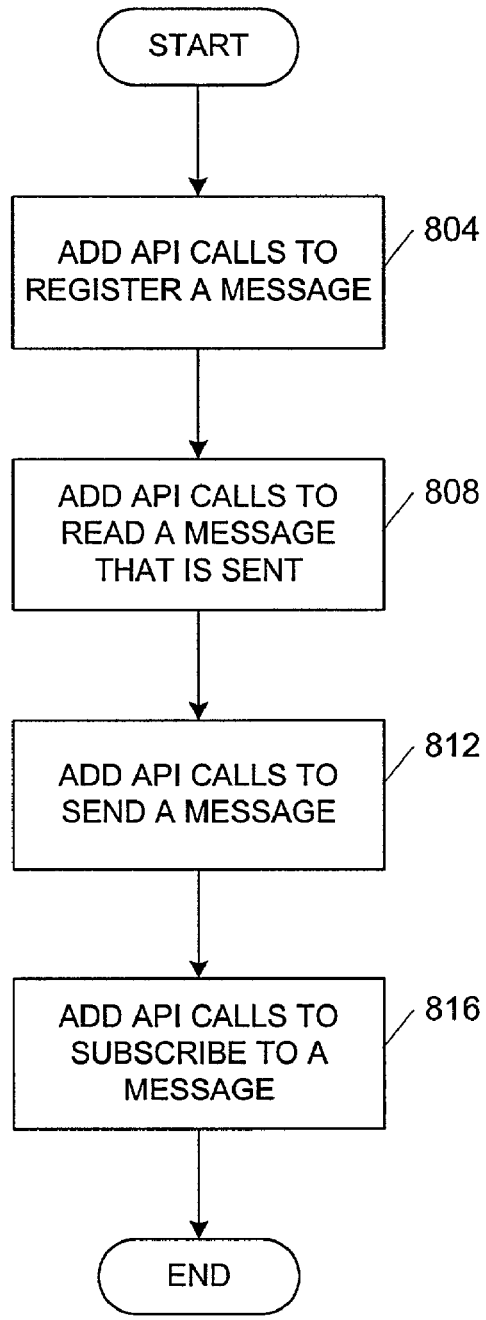
FIG. 8 is a flowchart illustrating a process of modifying a source file for use with the development and testing system of FIG. 1.

FIG. 8 is a flowchart illustrating a process of modifying source code to communicate with the DAT system 100. Depending on the embodiment, additional steps may be added, others removed, and the ordering of the steps rearranged. Starting at a step 804, a programmer adds API calls to invoke a registration method that is provided by the DAT system 100. In one embodiment of the invention, a registering thread provides a unique thread identification code.

Next, at a step 808, the programmer adds API calls to invoke a read method that is provided by the DAT system 100. Continuing to a step 812, the programmer adds, where applicable, API calls to invoke a send method that is provided by the DAT system 100.

Continuing to a state 816, the programmer adds API calls to "subscribe" to a message. Subscribing to a message allows a subscriber to bind to a specific message and thereafter receive all broadcast transmissions. Other messaging APIs may be provided by the DAT system 100 such as for the following: sending a command; sending a response; broadcasting a message; and defining the data (content) and meta-data (characteristics) of the payload of a message.

Figure 9:
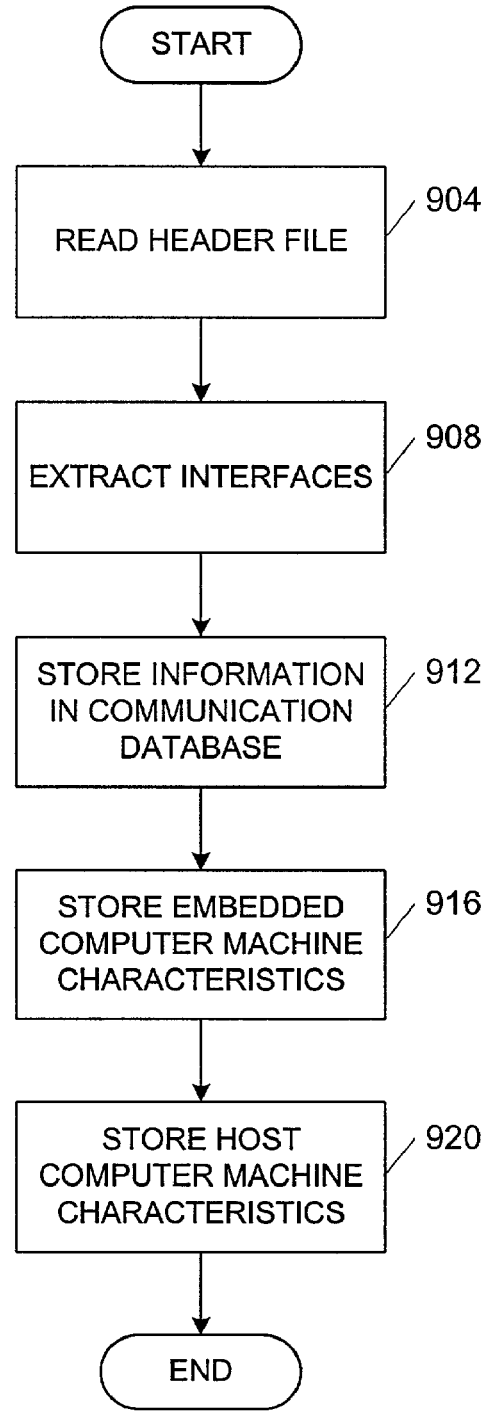
FIG. 9 is a flowchart illustrating a process of building the communication database of FIG. 1.

FIG. 9 is a block diagram illustrating an exemplary process of building the communication database 124. Depending on the embodiment, additional steps may be added, others removed, and the ordering of the steps rearranged. In one embodiment of the invention, the process shown in FIG. 9 is performed in response to a user request.

Starting at a state 904, the studio module 128 reads and extracts information from each of a plurality of interface definition files that are provided by the user. Next, at a step 908, the studio module 128 extracts the communication interfaces from each of the interface definition files. Information that is extracted can include: (i) the type of the communication, e.g., one-way, two-way, broadcast, remote function call; (ii) the types of data are passed as part of the communication; (iii) a description of the data types in the data structures that are part of a message or remote function call, e.g., integer, character, Boolean; (iv) a description of characteristics of embedded pointers that may be part of the message, e.g., whether the memory is "pooled" or "private", a method of transmitting the memory that is associated with the communication interface, and pointer data that is associated with the communication interface.

Next at a step 916, the studio module 128 stores the embedded computer machine characteristics. The embedded computer machine characteristics can be provided by user entry, automatic diagnosis of the embedded computer 104, or automatically provided by the embedded computer 104. Examples of the embedded computer machine characteristics are described above with respect to FIG. 6. In one embodiment, it is assumed that these characteristics are fixed, i.e., exactly the same on each connection.

Proceeding to a step 920, the studio module 128 stores the host computer machine characteristics. The host computer machine characteristics can be provided by user entry or automatic diagnosis of the host computer 108. Examples of the host computer machine characteristics are described above with respect to FIG. 6.

Figure 10:
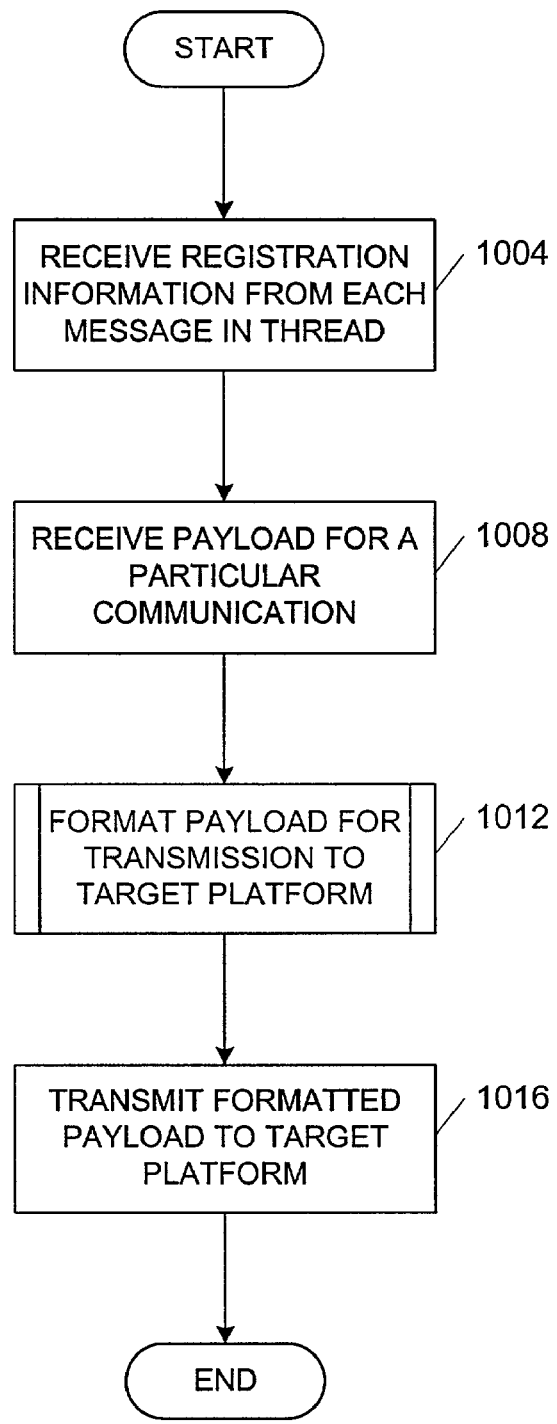
FIG. 10 is a flowchart illustrating a process of using the host platform communication module of FIG. 1.

FIG. 10 is a flowchart illustrating a process of using the DAT system 100. Depending on the embodiment, additional steps may be added, others removed, and the ordering of the steps rearranged. Starting at a step 1004, the DAT system 100 receives registration information from each thread. Next, at a step 1008, the DAT system receives a payload for a particular message.

Continuing to a step 1012, the DAT system 100 formats the payload for transmission to its destination thread. It is noted that if the destination thread is local to the transmitting thread, then formatting may be unnecessary. An exemplary process of formatting data for transmission to a remote platform is described below with reference to FIG. 11. Moving to a step 1016, the DAT system 100 transmits the formatted payload to the destination thread.

Figure 11:
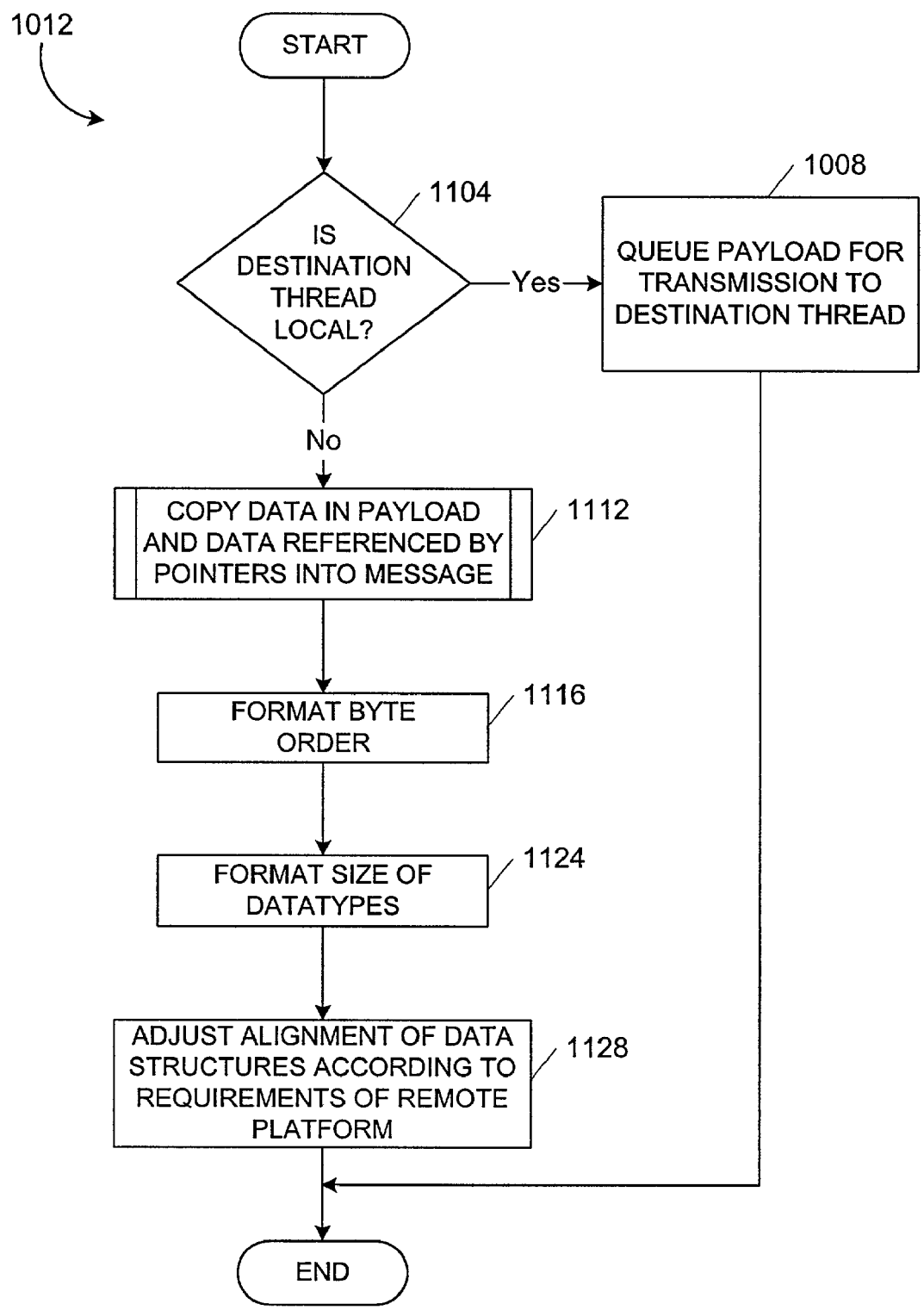
FIG. 11 is a flowchart illustrating a process of formatting a communication.

FIG. 11 is a flowchart illustrating a process of formatting data for use on an different platform. Depending on the embodiment, additional steps may be added, others removed, and the ordering of the steps rearranged. In one embodiment of the invention, the process that is performed by FIG. 11 is performed by the host computer communication module 116 of the DAT system 100. Furthermore, FIG. 11 is directed to a process of formatting a payload for transmission from one platform, e.g., the host computer 108 to another, e.g., the embedded computer 104.

The use of the process shown in FIG. 11 provides interoperability between applications communicating with each other on distributed heterogeneous computing platforms. In one embodiment of the invention, to reduce processing and memory requirements on embedded devices, the DAT system 100 performs all data formatting on the host computer 108.

The host computer 108 uses the platform characteristics of the embedded computer 104 and the host computer 108 and the individual interface definition information ("the communication interface information") to properly map messages when two applications on the different computers are communicating. In one embodiment, the embedded computer 104 always sends and receives messages in its native form, i.e., the form in which the message is stored in its memory. The host computer 108 maps these messages into its form when receiving them, and transforms the messages into the embedded computer 104 platform's native form when transmitting the messages to the embedded computer 104.

Starting at a decision state 1104, the host computer communication module 116 determines whether the destination thread is local or remote. If the thread is local, the process proceeds to a step 1108 and the payload is queued for transmission to the destination thread. If the transmission is local, no further modification of the payload is necessary.

Referring again to the decision step 1104, if the destination thread is not local, the process proceeds to a step 1112, wherein the host computer communication module 116 copies data in payload and data referenced by pointers into a message for transmission to the embedded computer 104. An exemplary process of managing pointer data is described in further detail below with reference to FIGS. 12A, 12B, 12C, and 12D.

Continuing to a step 1116, the host computer communication module 116 formats, if necessary, the byte order of the elements in data in the payload. For example, if the host computer 108 is Big Endian, and the embedded computer 104 is Little Endian, or vice-versa, the host computer communication module 116 reverses the order of the bits in the data.

Proceeding to a step 1124, the host computer communication module 116 formats the size of the data types in the payload. For example, if the embedded computer 104 uses a certain bit-length for certain data types and the host computer uses a different bit-length, the host computer communication module 116 adjusts the size of the data for transmission to the other platform. Moving to a step 1128, the host computer communication module 116 adjusts alignment of the data structures according to any requirement of the receiving platform.

Figure 12A:
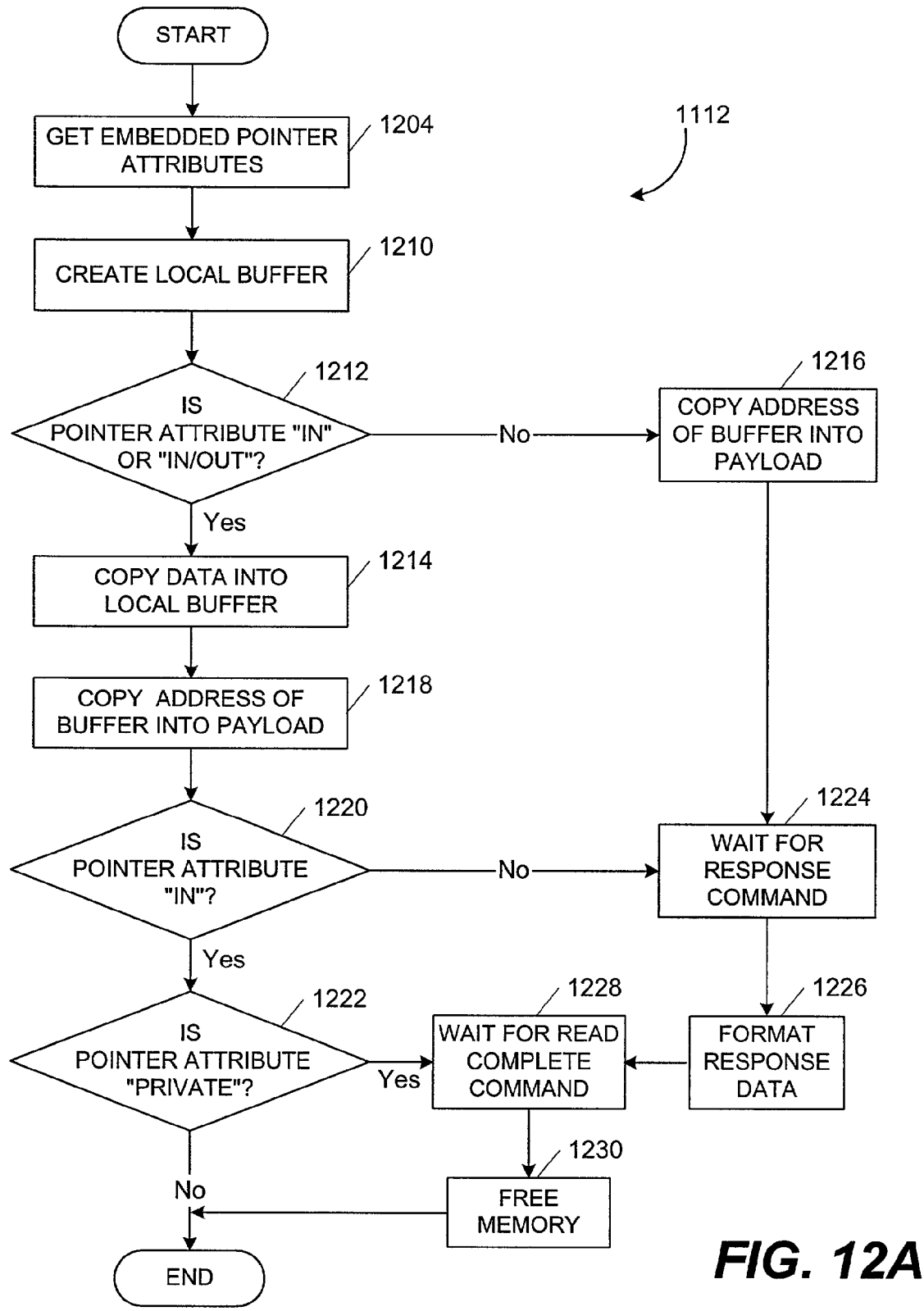
FIGS. 12A–12D illustrate exemplary methods of managing pointer data when transmitting the pointer data between two platforms having different machine characteristics.

FIGS. 12A–12D each illustrate an exemplary method of managing pointers in a payload that are passed from one platform to another. FIG. 12A is directed to a process of receiving a payload from a thread on the embedded computer 104 in connection with a "command" message. In one embodiment, FIG. 12A is performed with respect to each of the pointers in the payload. Depending on the embodiment, additional steps may be added, others removed, and the ordering of the steps rearranged. In one embodiment of the invention, the method shown in FIG. 12 is performed by the host computer communication module 116. It is noted that a similar process as shown in FIG. 12 is performed on the embedded computer communication module 112 when the embedded computer communication module 112 receives a command message. However, in one embodiment, for such a process the embedded computer communication module 112 does not perform any of inter-platform formatting of the received data as such formatting is performed by the host computer communication module 116.

Before starting at a state 1204, a thread on the embedded computer 104 has invoked a send command that is part of the application programming interface of the embedded computer communication module 112. In response, the embedded computer communication module 112 has built and then transmitted an inter-platform message to the host computer communication module 116. The inter-platform message includes the payload that was identified as part of the send command and, if applicable, the data that is referenced by the pointers in the payload.

Starting at a step 1204, the host computer communication module 116 gets the embedded pointer attributes of a selected pointer in the payload of the transmitted communication. In one embodiment of the invention, the attribute information is stored in the transmitted communication. A first attribute of each pointer is whether the pointer is classified as "IN", "OUT", or "IN/OUT". The "IN" attribute designates that the data referenced by the pointer is passed from the sender of the command to the owner of the message but no data is to be returned by the owner of the message. The "OUT" attributes designates that the sender of the command will not transmit any data that is referenced by the pointer but data will be returned by the owner and stored in the address referenced by the pointer. The "IN/OUT" attribute indicates that the data that is referenced by the pointer will be sent from the sender of the command and that the owner of the message will return data that is stored in the memory referenced by the pointer.

A second attribute of each pointer is whether the pointer is "private" or "pooled." Management (freeing of the memory when not in use) of "private" memory is handled by the DAT system 100. Management of "pooled" memory is handled by the user and/or the owner of a message.

Continuing to a step 1210, the host computer communication module 116 creates a local buffer to hold the pointer data. Continuing to a decision step 1212, the host computer communication module 116 determines whether the pointer attribute is either "IN" or "IN/OUT". If the pointer attribute is "IN" or "IN/OUT", the process proceeds to a step 1214. Continuing to a step 1214, the host computer communication module 116 copies the pointer data that was transmitted from the embedded computer 104 into the local buffer. At this step, the host computer communication module 116 formats the pointer data in accordance with the process described above with reference to steps 1116, 1124, and 1128.

Next, at a step 1218, the host computer communication module 116 copies the address of the buffer into the payload. Proceeding to a decision step 1220, the host computer communication module 116 determines whether the first attribute of the pointer is "IN". If the first attribute of the pointer is "IN" the process proceeds to a decision step 1222. At the decision step 1222, the host computer communication module 116 determines whether the second attribute of the pointer is "private". If the second attribute of the pointer is private, the process proceeds to a step 1228. Otherwise if the second attribute of the pointer is not private, i.e., pooled, the process ends.

Referring again to the decision step 1212, if the first attribute is not "IN" or "IN/OUT", the attribute is the "OUT" and the process proceeds to a step 1216. At the step 1216, the host computer communication module 116 copies the address of the local buffer into the payload. From step 1216, or from decision step 1220 (if the first attribute is "IN/OUT"), the process proceeds to a step 1224. At this step, the host computer communication module 116 waits for thread on the host computer 108 to invoke a response command that is provided by the application programming interface of the DAT system 100. Upon receiving the response, the process proceeds to a step 1226. At this step, the response data is formatted for transmission to the embedded computer 104.

From either step 1226 or from the decision step 1222 (if the second attribute of the pointer is "private"), the process proceeds to a step 1228 wherein the host computer communication module 116 waits for a thread on the host computer 104 to invoke a read complete command that is in the application programming interface of the host computer communication module 116. Upon receipt of the read complete command, the process proceeds to a step 1230 wherein the host computer communication module frees the memory.

Figure 12B:
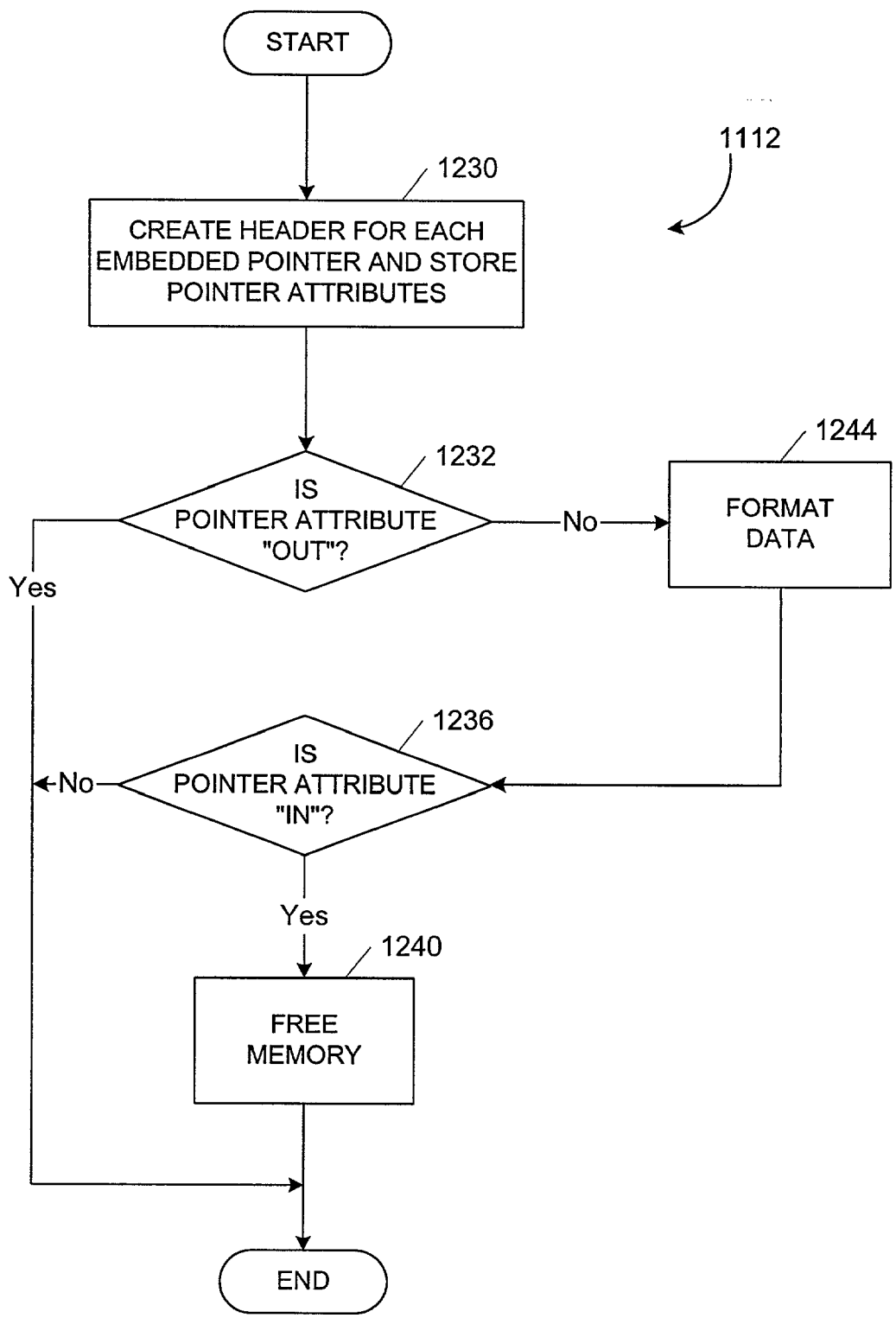

FIG. 12B is directed to a process of managing pointers in a payload in a command message that is sent from a thread on the host computer 108 to a thread on embedded computer 104. FIG. 12B illustrates in further detail the steps that occur in step 111 of FIG. 11. In one embodiment, FIG. 12B is performed with resect to each of the pointers in the payload. Depending on the embodiment, additional steps may be added, others removed, and the ordering of the steps rearranged. A similar process is performed by the embedded computer when transmitting a command message from a thread on the embedded computer 104 to the host computer 108. However, in this process, the embedded computer communication module 112 does not perform any formatting of the transmitted payload since the formatting is performed by the host computer communication module 116 upon receipt of the payload.

Starting at a step 1230, the host computer communication module 116 creates a buffer to hold an inter-platform message for transmission to the embedded computer 104. Also, at this step, the host computer communication module 116 creates a header in the inter-platform message for the embedded pointer. Furthermore, at this step, the host computer communication module 116 stores the pointer attributes of the pointer in the inter-platform message.

Continuing to a decision step 1232, the host computer communication module 116 determines whether the pointer attribute of the pointer is "OUT". If the attributes of a selected pointer is "OUT", the process ends. However, if the pointer attribute is not "OUT", i.e., it is "IN" or "IN/OUT", the process proceeds to step 1244. At the step 1244, host computer communication module 116 copies the data referenced by the pointer into the header. Furthermore, the host computer communication module 116 formats the data for use by a thread on the embedded computer 108. For example, the host computer communication module performs the steps described above with respect to steps 1116, 1124, and 1128.

Next, at a decision step 1236, the host computer communication module 116 determines whether the pointer attributes is "IN." If the pointer attribute is "IN", the process proceeds to a step 1240. At this step, the host computer communication module 116 frees the memory, if warranted, i.e., the attributes of the pointer designate "pool". However, if the pointer attribute is not "IN", the proceeds ends.

Figure 12C:
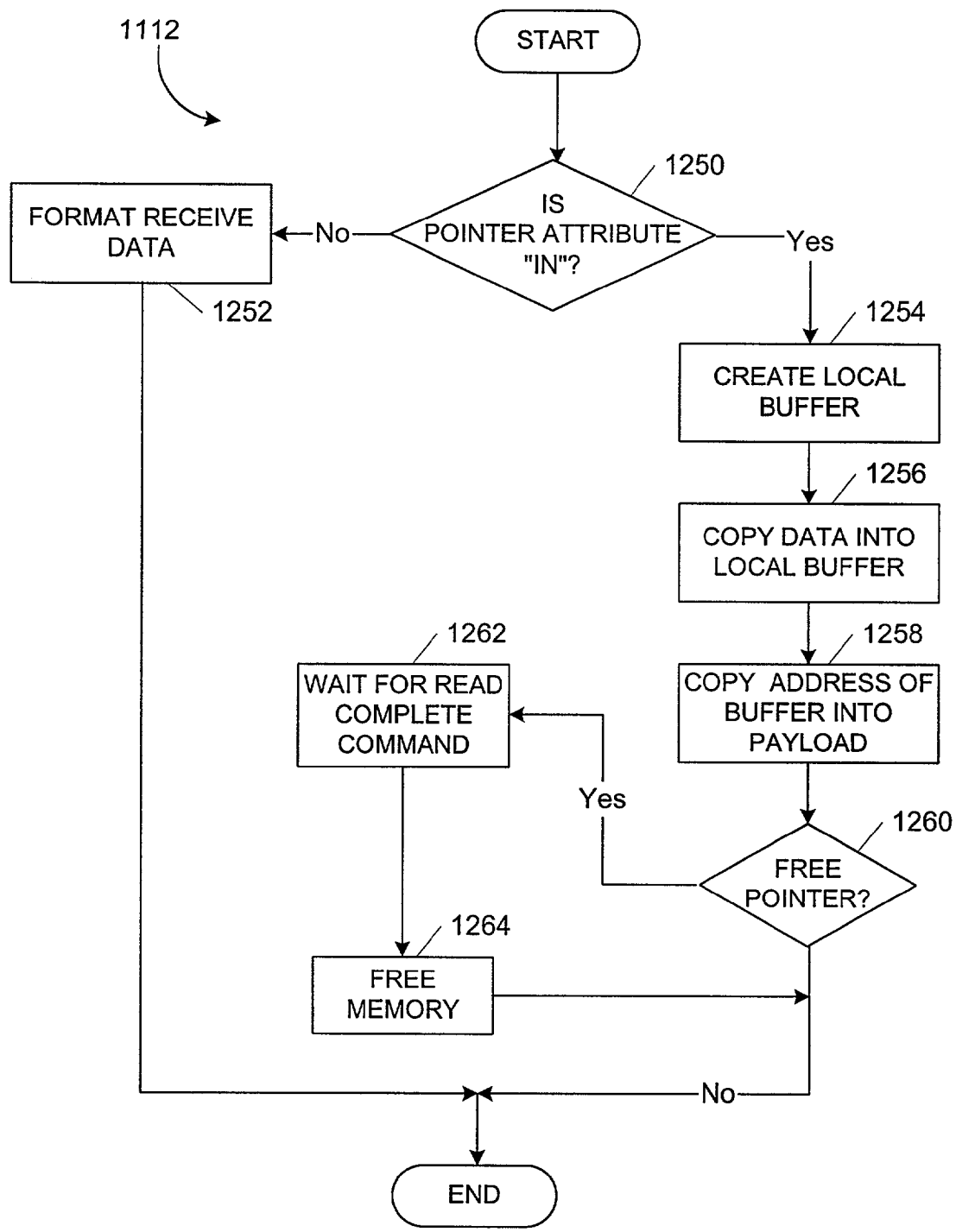

FIG. 12C is directed to a process of receiving a response message from the embedded computer communication module 112. FIG. 12C illustrates in further detail the steps that occur in step 111 of FIG. 11. In one embodiment, FIG. 12C is performed with resect to each of the pointers in the payload. Depending on the embodiment, additional steps may be added, others removed, and the ordering of the steps rearranged. A similar process is performed by the embedded computer 104 when transmitting a command message from a thread on the embedded computer 104 to the host computer 108. However, in this process, the embedded computer communication module 112 does not perform any formatting of the transmitted payload since the formatting is performed by the host computer communication module 116 upon receipt of the payload.

Before starting at a state 1250, a thread on the embedded computer 104 has invoked a send response command that is part of the application programming interface of the embedded computer communication module 112. In response, the embedded computer communication module 112 has built and then transmitted an inter-platform message to the host computer communication module 116. The inter-platform message includes the payload that was identified as part of the send response and, if applicable, the data that is referenced by the pointers in the payload.

Starting at a decision step 1250, the host computer communication module 116 determines whether the pointer attributes of the pointer in the inter-platform message designate the attribute "IN". If the pointer attributes designate the attribute "IN", the process proceeds to a step 1252, and the host computer communication module 116 formats the received data for use with the host computer 108. For example, in one embodiment, the host computer communication module 116 performs the steps described above with respect to steps 1116, 1124, and 1128.

However, if the pointer attributes do not designate "IN", i.e., the pointer attributes designate "IN/OUT" or "OUT", the process proceeds to a step 1254. At the step 1254, the host computer communication module 116 creates a local buffer to store the pointer data that was transmitted by the embedded computer 104. Continuing to a step 1256, the host computer communication module 116 copies the pointer data from the inter-platform communication into the local buffer. Next, at step 1258, the host computer communication module 116 copies the address of the buffer into the received payload.

Proceeding to a decision step 1260, the host computer communication module 116 determines whether it should free the pointer. In one embodiment of the invention, this is determined by reading the pointer attributes. If the pointer attributes designate "private" the host computer communication module 116 decides to free the memory. However, if the pointer attributes designate "pooled" the host computer communication module 116 allows the user to free the memory.

If the host computer communication module 116 determines in step 1260 to free the memory, the process proceeds to a step 1262, wherein the host computer communication module 116 waits for a thread on the host computer 108 to invoke the read complete command. Continuing to a step 1264, the host computer communication module 116 frees the local buffer. From either decision step 160 (if the host computer communication module 116 does not free the pointer) or the step 1264 the process ends.

Figure 12D:
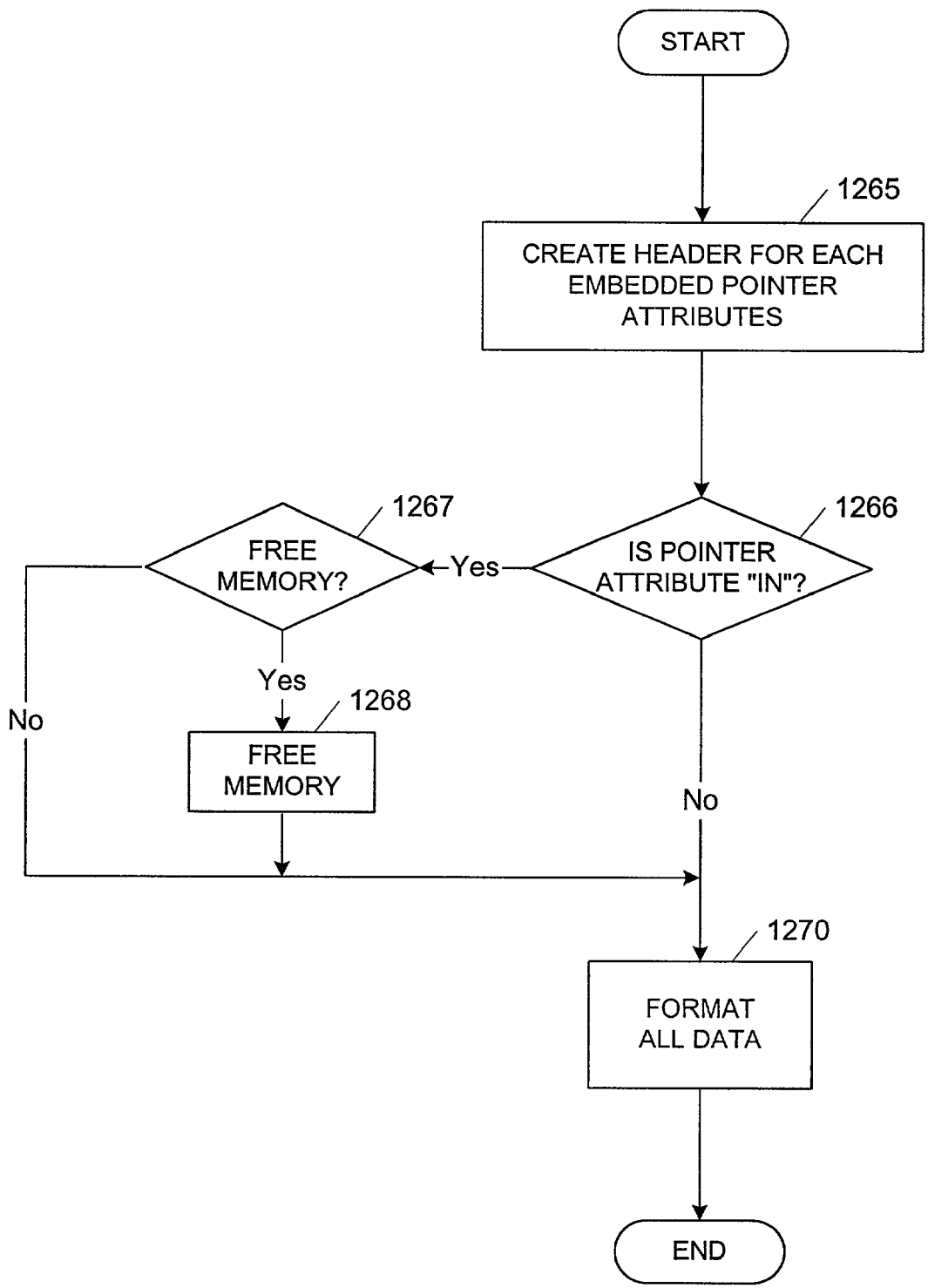

FIG. 12D is directed to an exemplary process of managing pointers in a payload in a response message that is sent from a thread on the host computer 108 to a thread on embedded computer 104. FIG. 12D illustrates in further detail the steps that occur in step 1112 of FIG. 11. In one embodiment, FIG. 12D is performed with reset to each of the pointers in the payload. Depending on the embodiment, additional steps may be added, others removed, and the ordering of the steps rearranged. A similar process is performed by the embedded computer 104 when transmitting a response message from a thread on the embedded computer 104 to the host computer. However, in this process, the embedded computer communication module 112 does not perform any formatting of the transmitted payload since the formatting is performed by the host computer communication module 116 upon receipt of the payload.

Before starting, a thread on the embedded computer 104 has sent a command message and a thread on the host computer 108 has responded by invoking the send response routine of API of the DAT system 100.

Starting at a step 1265, the host computer communication module 116 allocates space in an outgoing buffer ("a header") to store the data that is referenced by the pointer. The outgoing buffer is part of an inter-platform message that is sent from the host computer communication module 116 to the embedded computer communication module 112. Proceeding to a decision step 1266, the host computer communication module 116 determines whether the pointer attributes designate "IN". If the pointer attributes do designate "IN", i.e., they do not designate "OUT" or "IN/OUT", the process proceeds to a decision step 1267. At the decision step 1267, the host computer communication module 116 determines whether to free memory that is associated with the memory that was allocated during the corresponding send command. In one embodiment of the invention, this is determined by reading the pointer attributes. If the pointer attributes designate "pool" the host computer communication module 116 decides to free the memory. However, if the pointer attributes designate "private" the host computer communication module 116 allows the user to own and eventually free the memory (via an routine provided by the local operating system). If the host computer communication module 116 determines it should free the memory, the process proceeds to a step 1268, and the host computer communication module 116 frees the memory. From either step 1268 or decision step 1266 (if the pointer attributes does not designate "IN"), the process proceeds to a step 1270 and the host computer communication module 116 formats the data referenced by the pointer for transmission to the embedded computer. For example, in one embodiment, the host computer communication module 116 performs the steps described above with respect to steps 1116, 1124, and 1128. As part of the formatting, the formatted data is stored in the header (step 1265).

Figure 13:
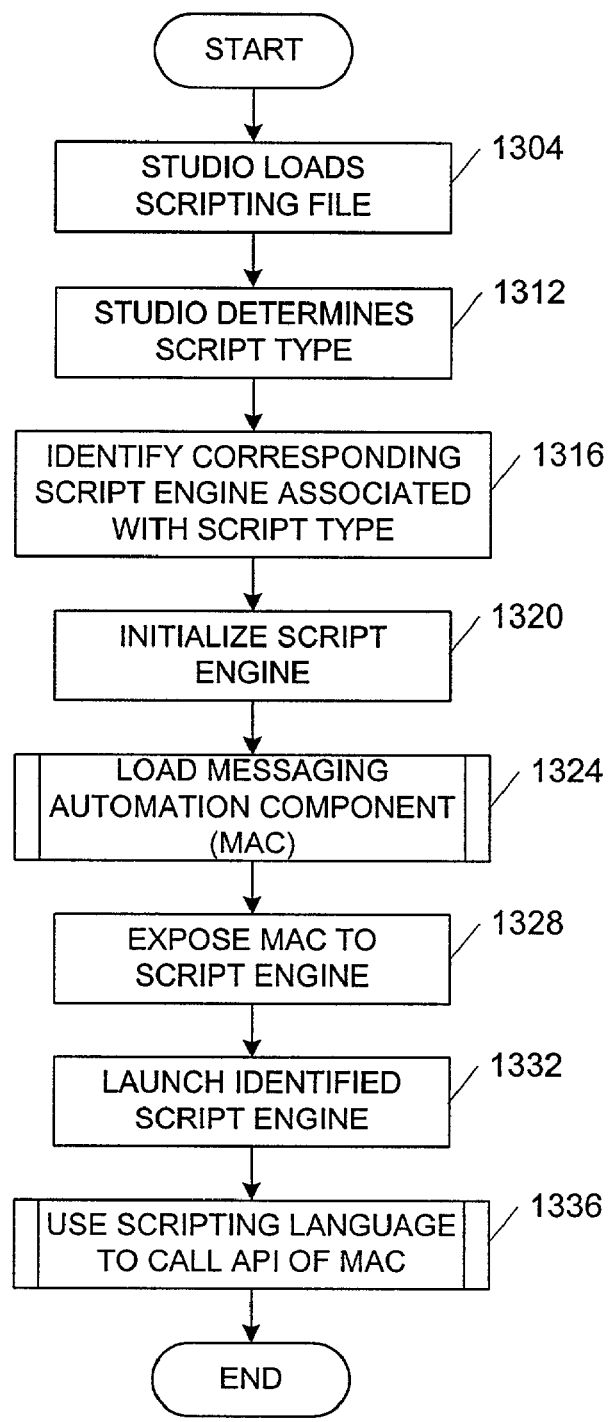
FIG. 13 is a flowchart illustrating a process of using a scripting file to communicate with threads executing on the embedded computer.

FIG. 13 is flowchart illustrating a process of using the DAT system 100 from a script in the script engine 312. Depending on the embodiment, additional steps may be added, others removed, and the ordering of the steps rearranged. Starting at a step 1304, the studio module 128 has received a request from a user to load a script file and it does so here. Next, at a step 1312, studio determines script type that is associated with the script file. The script type can be determined in different ways, including examining the extension of the identified script file or from the contents of the script itself. Exemplary types of scripting languages include: JavaScript, Visual Basic, VBScript, Tcl, JScript, Python, etc.

Moving to a step 1316, the studio module 128 identifies the corresponding script engine 312 that is associated with the script type. Continuing to a step 1320, the studio module 128 initializes the script engine 312.

Next, at a step 1324, the studio module 128 loads the messaging automation component ("MAC") 304. The process of loading the MAC 304 is described below with reference to FIG. 14. Proceeding to a step 1328, the MAC 304 is "exposed" to the script engine 312. In one embodiment of the invention, exposing the MAC 304 includes providing the script engine 312 a handle to the MAC 304. Next, at a step 1332, the script engine is launched, allowing the script loaded in a step 1304 to access the API of MAC 304. Moving to a step 1336, a script program can communicate with threads 114 using the API of the MAC 304. An exemplary process of using the MAC 304 is described below with respect to FIG. 15.

Figure 14:
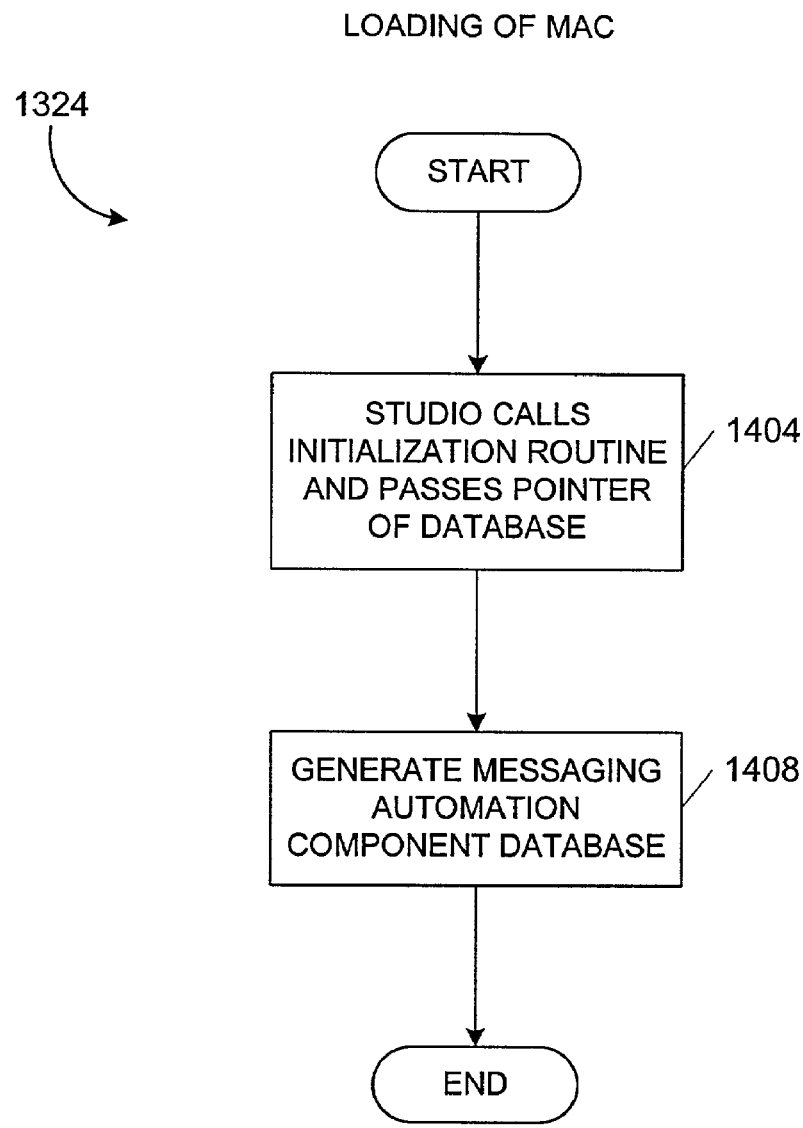
FIG. 14 is a flowchart illustrating a process of loading the messaging automation component of FIG. 3.

FIG. 14 is a flowchart illustrating a process of loading the MAC 304. FIG. 14 illustrates in further detail the steps that occur in step 1324 of FIG. 13. Starting at a step 1404, the studio module 128 calls the initialization routine of the MAC 304 and passes as a parameter a handle to the communication database 124. Next, at a step 1408, the MAC 304 generates a messaging automation component "MAC" database object. The MAC database object contains certain of the information from the communication database 114. The MAC database is used by the scripting program to access application programming interfaces of the MAC 304.

Figure 15:
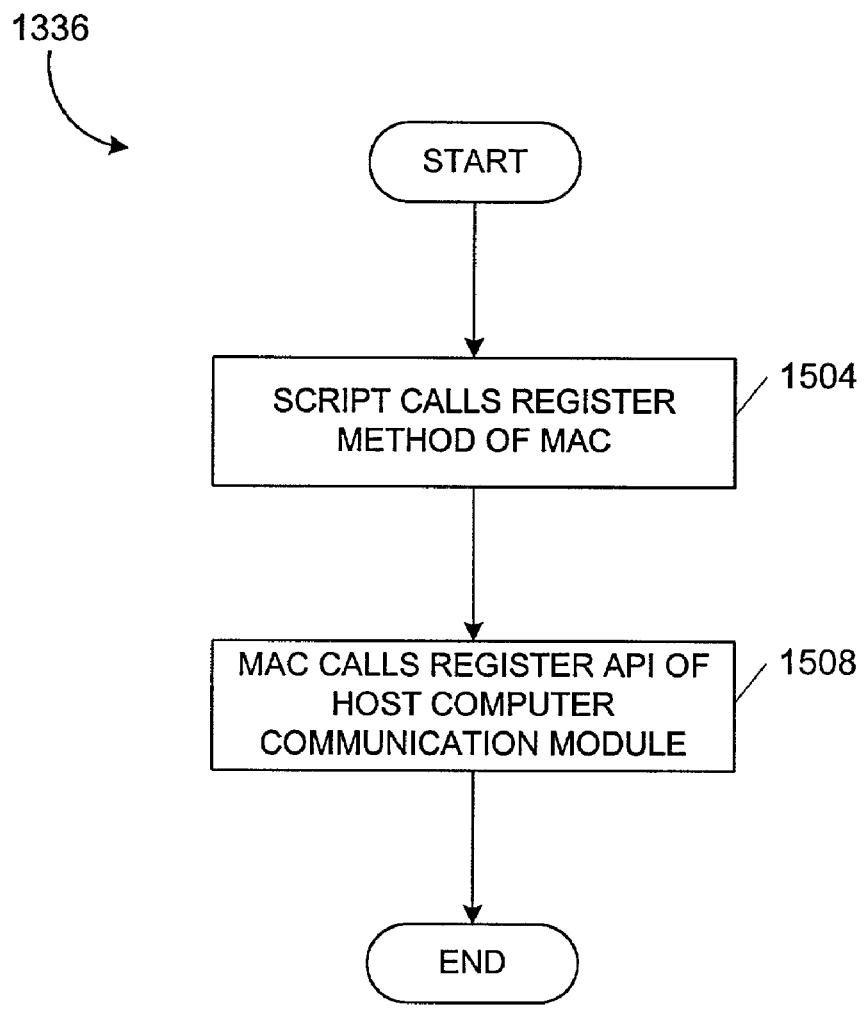
FIG. 15 is a flowchart illustrating a process of registering a thread executing in a script with the development and testing system of FIG. 3.

FIGS. 15–17 are flowcharts illustrating a process of communicating with the MAC 308 using a scripting language. Depending on the embodiment, additional steps may be added, others removed, and the ordering of the steps rearranged. FIG. 15 is a flowchart directed to a process of registering a particular message with the MAC 304. Starting at a step 1504, a script that is executing in the scripting engine 312 invokes a register method of the MAC 304. Proceeding to a step 1508, the MAC object calls the register API of the host computer communication module 116.

Figure 16A:
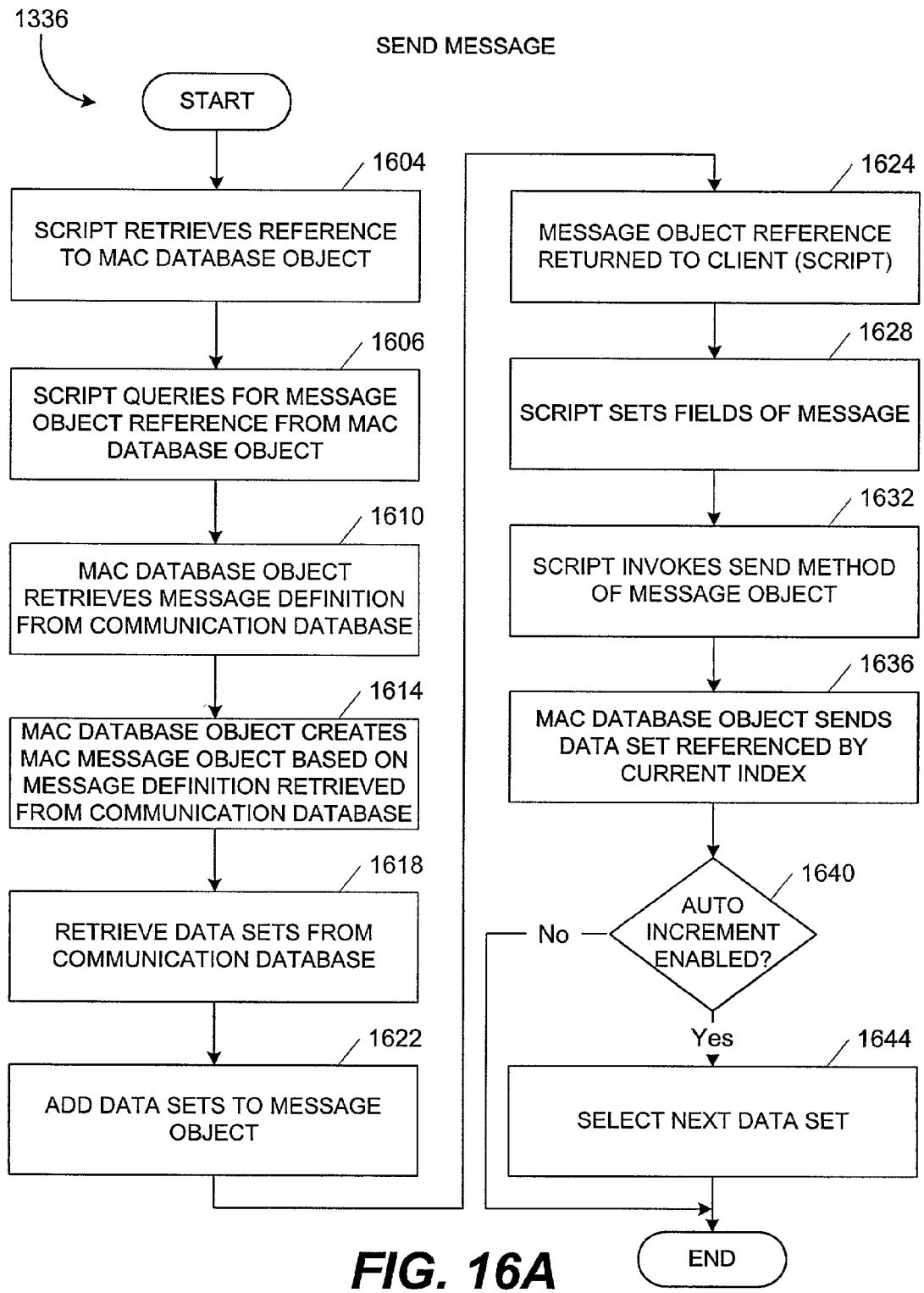
FIG. 16A is a flowchart illustrating a process of sending a message communication from a script to the development and testing system of FIG. 3.

FIG. 16A is a flowchart illustrating a process of sending a message via the MAC 304. Starting at a step 1604, the script retrieves reference to a MAC database object. Next, at a step 1606, the script requests the MAC database object to provide a reference to a message object. The message object is used by the script program to communicate with a owner of a communications or to receive communications from others. Using the message object, a script can set fields of the message, send a message, receive a message, and perform other standard messaging functions.

Continuing to a step 1610, the MAC database object retrieves the message definition information from the communication database 124. In one embodiment of the invention, the message definition information is retrieved via the host computer communication module 116. In another embodiment of the invention, the message definition information is retrieved directly from the communication database 124. The message definition information includes: (i) the type of the communication, e.g., one-way, two-way, broadcast, remote function call and (ii) the types of data that are passed as part of the communication. Next, at a step 1614, the MAC database object creates a MAC message object based upon the prototype definition retrieved from the communication database 124.

Proceeding to a step 1618, the MAC database object retrieves any data sets from the communication database that are stored with respect to the requested message object. Next, at a step 1622, the MAC database object adds the data sets to the message object (created in step 1614).

Moving to a step 1624, the MAC database object returns a reference to the message object to the script. Next, at a step 1628 the script can set the data fields of the message using reference to the message object. The script has access via the MAC database object to a plurality of readable and writeable data sets. At this step, the script can identify one of the data sets for subsequent usage. Continuing to a step 1632, the script invokes a send method of the method object. Proceeding to a step 1636, the MAC database object sends a data set that is referenced by the current index to the thread that owns the message.

Next, at a decision step 1640, the MAC database object determines whether auto-increment is enabled. Auto-increment enables a script to send different data sets with each send command. If auto-increment is enabled, the process proceeds to a step 1644, and the MAC database object selects the next data set. Referring again to the decision step 1640, if auto-increment is not enabled, the process ends.

Figure 16B:
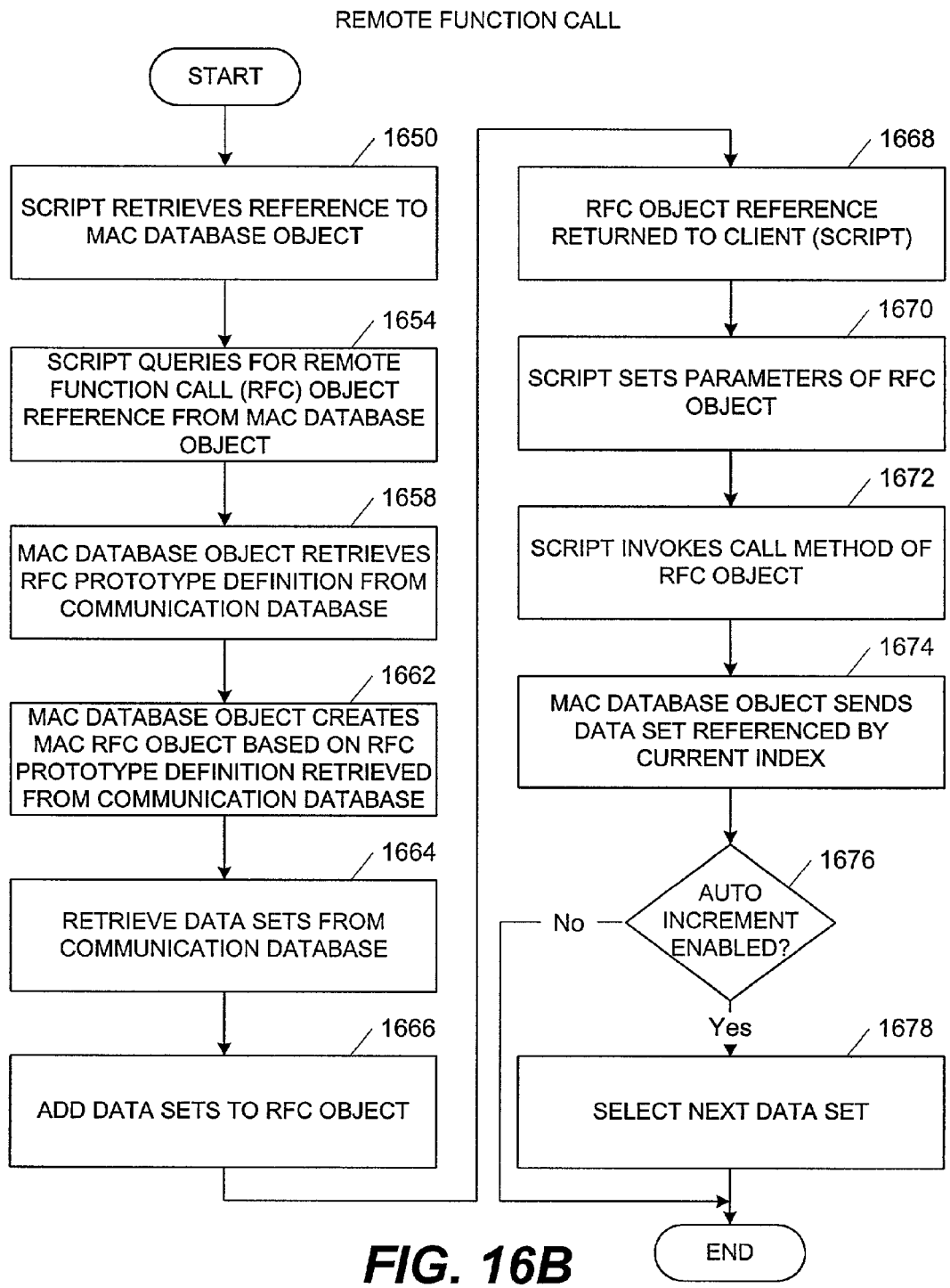
FIG. 16B is a flowchart illustrating a process of sending a invoking a function call from a script to the development and testing system of FIG. 3.

FIG. 16B is a flowchart illustrating a process of invoking a function via the MAC 304. Starting at a step 1650, the script retrieves reference to the MAC database object. Next, at a step 1654, the script requests the MAC database object to provide a reference to a remote function call object. The remote function call object is used by the script program to communicate with the thread that handles the remote function call. Using the remote function call object, a script can set the parameters that will be passed upon invoking the remote function call.

Continuing to a step 1658, the MAC database object retrieves the remote function call prototype definition information from the communication database 124. In one embodiment of the invention, the prototype definition information is retrieved via the host computer communication module 116. In another embodiment of the invention, the message definition information is retrieved directly from the communication database 124.

Next, at a step 1662, the MAC database object creates a MAC remote function call object based upon the remote function call prototype definition retrieved from the communication database 124.

Proceeding to a step 1664, the MAC database object retrieves any data sets from the communication database that are stored with respect to the requested remote function call object. Next, at a step 1666, the MAC database object adds the data sets to the MAC remote function call object.

Moving to a step 1668, the MAC database object returns a reference to the remote function call object to the script. Next, at a step 1670, the script can set the data fields (parameters) of the remote function call using the remote function call object. The script has access via the MAC database object to a plurality of readable and writeable data sets. At this step, the script can identify one of the data sets for subsequent usage. Continuing to a step 1672, the script invokes a call method of the remote function call object. Proceeding to a step 1674, the MAC database object sends a data set that is referenced by the current index to the thread that handles the remote function call.

Next, at a decision step 1676, the MAC database object determines whether auto-increment is enabled. Auto-increment enables a script to send different data sets with each send command. If auto-increment is enabled, the process proceeds to a step 1678, and the MAC database object selects the next data set. Referring again to the decision step 1676, if auto-increment is not enabled, the process ends.

Figure 17A:
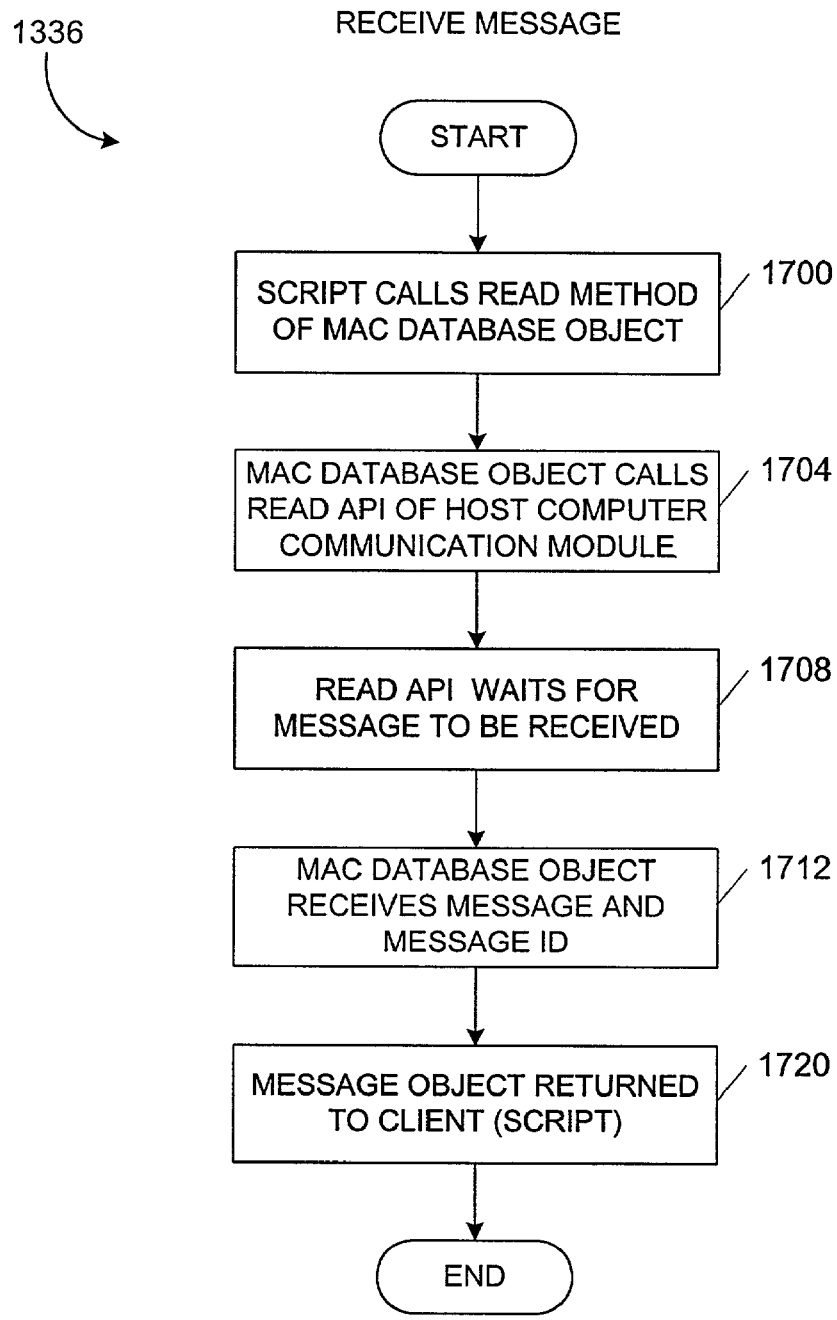
FIG. 17A is a flowchart illustrating a process of a script receiving a message via a script from the development and testing system of FIG. 3.

FIG. 17A is a flowchart illustrating a process of a script receiving a message via the MAC 304. Depending on the embodiment, additional steps may be added, others removed, and the ordering of the steps rearranged.

Starting at a step 1700, the script calls a read method of the MAC database object. Next, at a step 1704, the MAC database object calls a read API of the host computer communication module 116. Continuing to a step 1708, the host computer communication module 116 waits for a message to be received. Proceeding to a step 1712, the MAC database object receives the message and a message identifier from the host computer communication module 116. Next, at a step 1720, the MAC database object returns a message object to the script, which can in turn access the contents of the requested message.

Figure 17B:
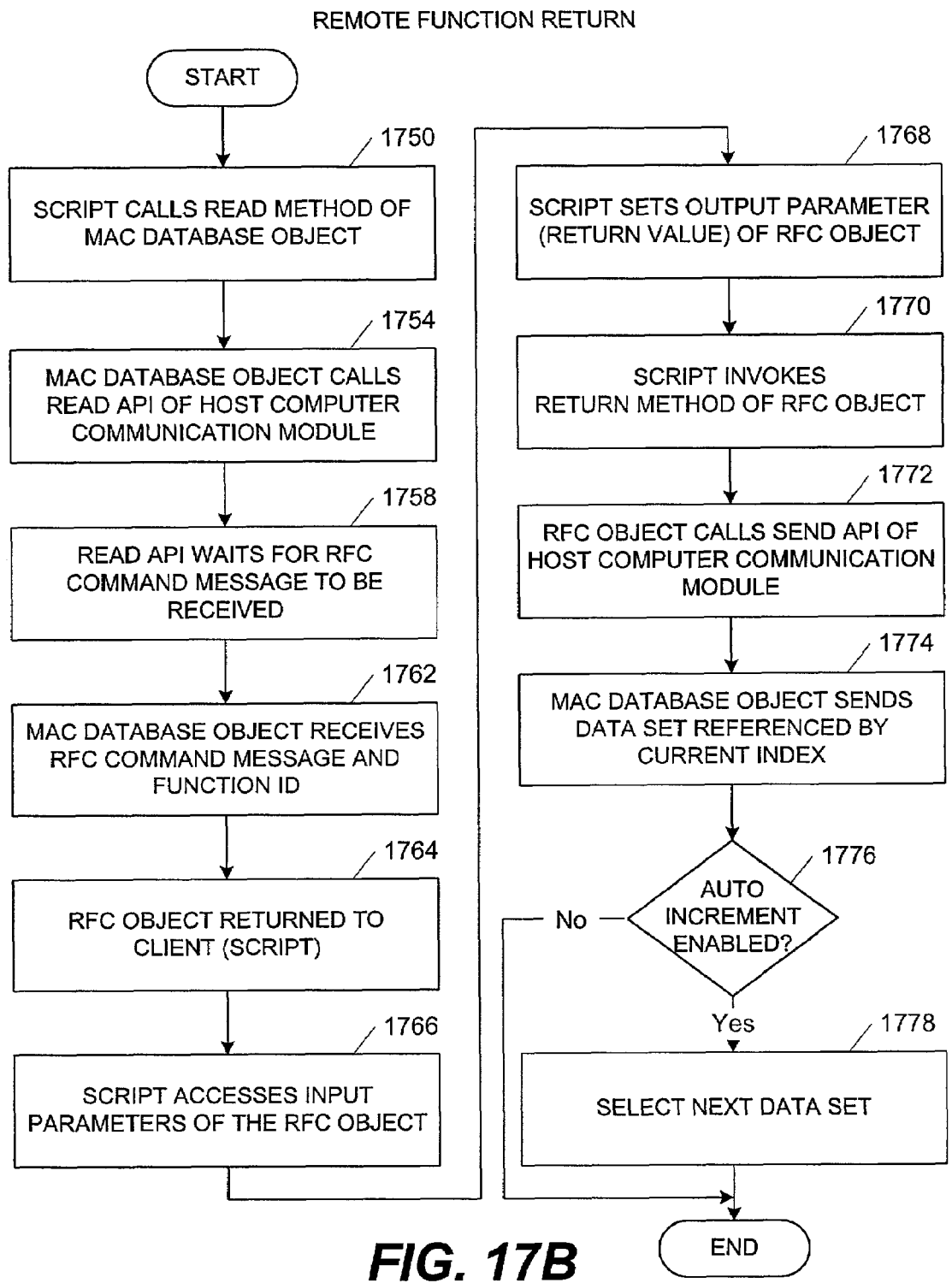
FIG. 17B is a flowchart illustrating a process of a script receiving a communication via remote function call from the development and testing system of FIG. 3.

FIG. 17B is a flowchart illustrating a process of a script receiving a communication via function call application programming interfaces that are provided by the MAC 304. Depending on the embodiment, additional steps may be added, others removed, and the ordering of the steps rearranged. Starting at a step 1750, the script calls a read method of the MAC database object. Next, at a step 1754, the MAC database object calls the read API of the host computer communication module 116.

Continuing to a step 1758, the MAC database object waits for a remote function call command message to be received. Next, at a step 1762, the MAC database object receives the remote function command message and the function identifier.

Proceeding to a step 1764, a remote function call object is returned to the script program. Next, at a step 1766, the script program access the input parameters of the remote function call object.

Moving to a step 1768, the MAC database object returns a reference to the remote function call object to the script. Next, at a step 1770, the script invokes a return method of the remote function call object. Continuing to a step 1772, the remote function call object calls the send application programming interface of the host computer communication module 116. Proceeding to a step 1774, the MAC database object sends a data set that is referenced by the current index to the thread that handles the remote function call.

Next, at a decision step 1776, the MAC database object determines whether auto-increment is enabled. Auto-increment enables a script to send different data sets with each send command. If auto-increment is enabled, the process proceeds to a step 1778, and the MAC database object selects the next data set. Referring again to the decision step 1776, if auto-increment is not enabled, the process ends.

Figure 18:
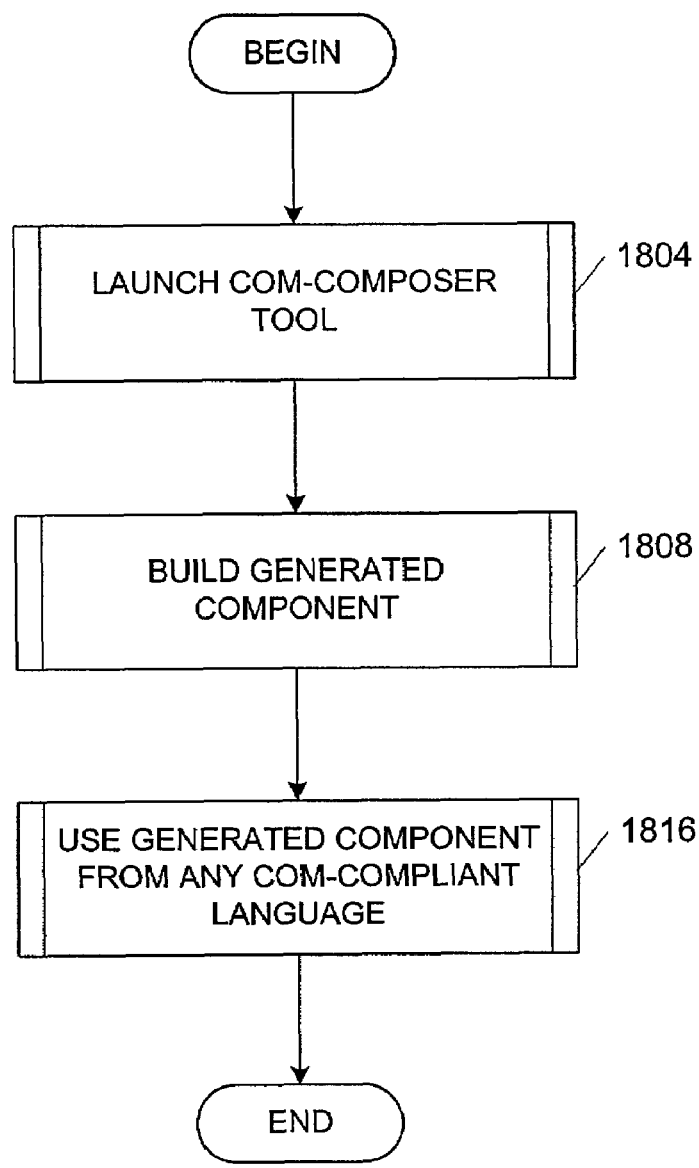
FIG. 18 is a flowchart illustrating a process of utilizing the generated component of FIG. 5.

FIG. 18 is a flowchart illustrating a process of interfacing with the DAT system 100 from any COM-compliant language. Depending on the embodiment, additional steps may be added, others removed, and the ordering of the steps rearranged. Starting at a step 1804, a user loads "launches" the COM composer tool 504 (FIG. 5). An exemplary process of loading the COM composer tool is described below with reference to FIG. 19.

Next, at a step 1808, the COM composer builds the generated component 508 (FIG. 5). The generated component 508 is a COM object that is accessible by other COM compliant programs. Using the generated component 508, a COM-compliant program can easily: test a interface, send a communication to a thread that is executing on the embedded computer 104 or the host computer 108, receive a communication that is sent from a thread this executing on the embedded computer or the host computer 108, and other functions as described herein. The generated component 508 provides a plurality of predefined interfaces for performing each of the foregoing functions. An exemplary process of building the generated component 508 is described below with reference to FIG. 20.

Continuing to a step 1816, the generated component 508 is accessible via any COM-compliant language. An exemplary process of using the generated component is described below with reference to FIG. 22.

Figure 19:
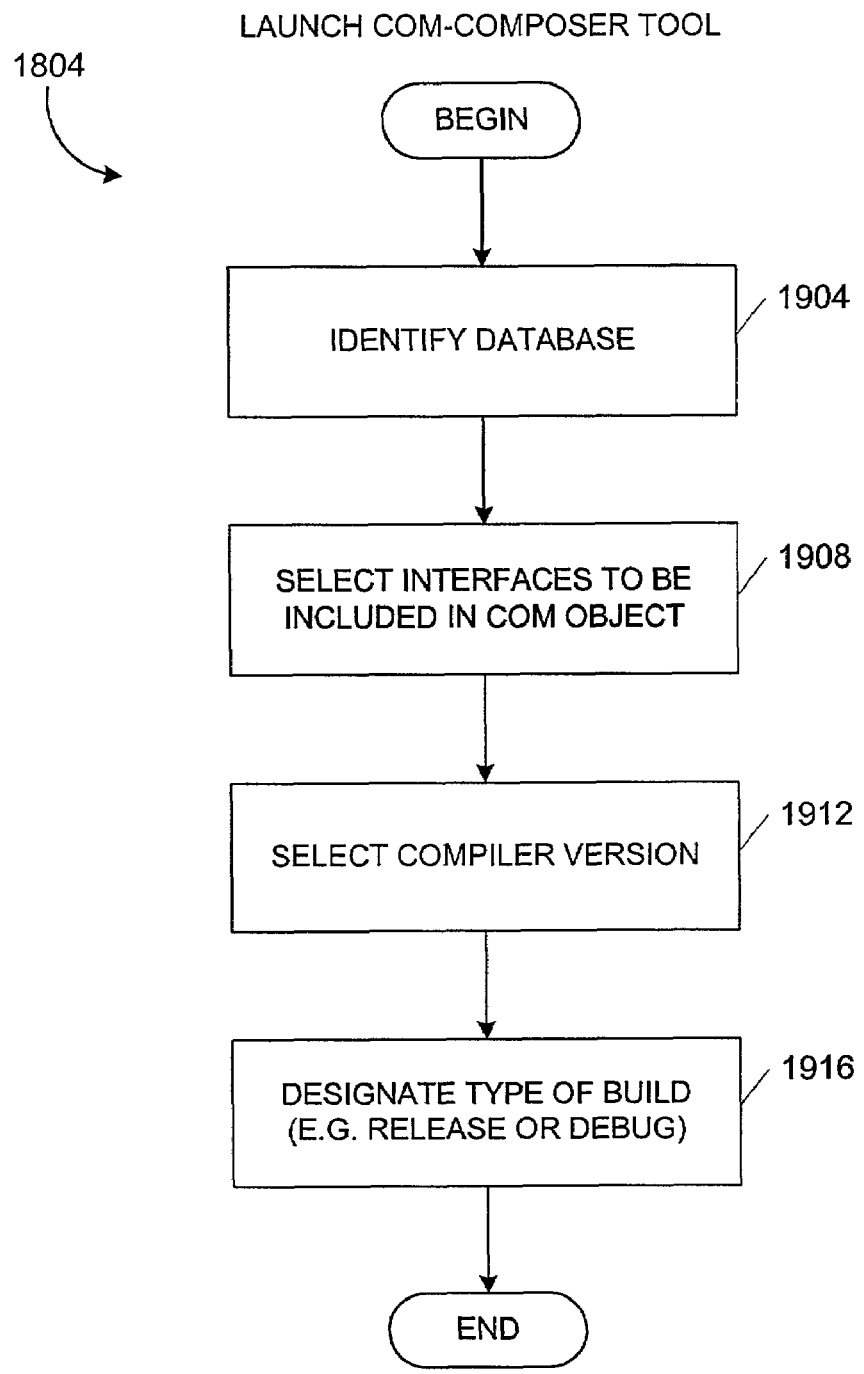
FIG. 19 is a flowchart illustrating a process of launching the COM composer of FIG. 5.

FIG. 19 is a flowchart illustrating an exemplary process of launching the COM composer tool 504. FIG. 19 illustrates in further detail certain steps that occur in step 1804 of FIG. 18. Depending on the embodiment, additional steps may be added, others removed, and the ordering of the steps rearranged.

Starting at a step 1904, a user identifies a database. The DAT system 100 can support multiple databases for multiple projects. Continuing to a step 1908, the user selects which messages or functions of the selected database are to be included in the generated COM object. In one embodiment of the invention, the user selects the messages and/or remote function calls via a graphical user interface utility.

Proceeding to a step 1912, the user selects the compiler version. The COM composer 504 needs to know the version of the compiler that is being used to build the generated component 508 to provide the proper control files in the proper format. Moving to a step 1916, the COM composer 504 requests the user to designate the type of build, e.g., release or debug.

Figure 20:
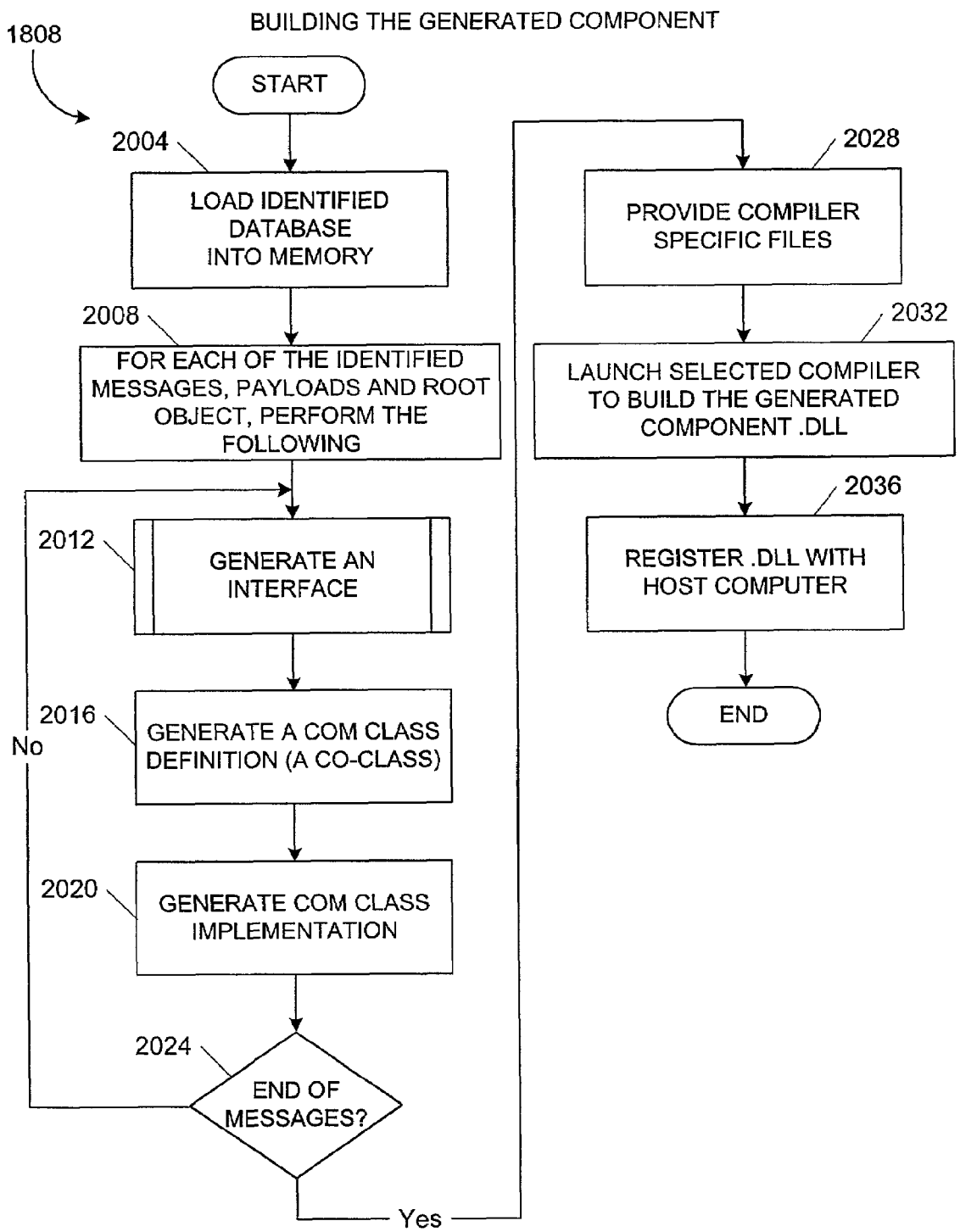
FIG. 20 is a flowchart illustrating a process of building the generated component of FIG. 5.

FIG. 20 is a flowchart illustrating an exemplary process of building the generated component 508. FIG. 20 illustrates in further detail certain steps that occur in step 1808 of FIG. 18. Depending on the embodiment, additional steps may be added, others removed, and the ordering of the steps rearranged.

Starting at a step 2004, the COM composer tool loads the data that was identified by the user (step 1904) into memory. Next, at a step 2008, the COM composer tool begins a process that is performed with respect to the following: (i) all of the messages and/or remote function calls identified by the user (step 1908), (ii) all of the payloads of the identified messages and/or remote function calls, and (iii) the root object that is used to access all other objects in the generated component 508. In one embodiment, steps 2012, 2016, 2020, and 2024 are performed for each of the foregoing objects.

At the step 2012, the COM composer 504 generates a software interface for each of the objects. An exemplary process of generating an interface is described below with reference to FIG. 21. Next, at a step 2016, the generated component generates a COM class definition for the object, otherwise known as a co-class. Proceeding to a step 2020, the COM composer generates a COM class implementation for each of the COM objects. For further information regarding generating software interfaces, COM class definitions, and a COM class implementations, please see the following references, which are each incorporated by reference in their entirety: DON Box, ESSENTIAL COM (1998), and BRENT RECTOR, CHRIS SELLS & JIM SPRINGFIELD, ATL INTERNALS (1999).

Moving to a decision step 2024, the COM composer 504 determines whether it has processed all of the messages/ remote function calls, payloads, and the root object. If all of these items have not been processed, the process returns to the step 2012 (discussed above). However, if all of the items have been processed, the COM composer 504 proceeds to a step 2028 and provides any compiler specific files that are needed, if any.

Next, at a step 2032, the COM composer 504 launches the selected compiler to build the generated component 508. In one embodiment of the invention, the COM component is provided in a dynamic link library ".DLL". Moving to a step 2036, the COM composer 504 registers the dynamic link library with a registry in the host computer 108.

Figure 21:
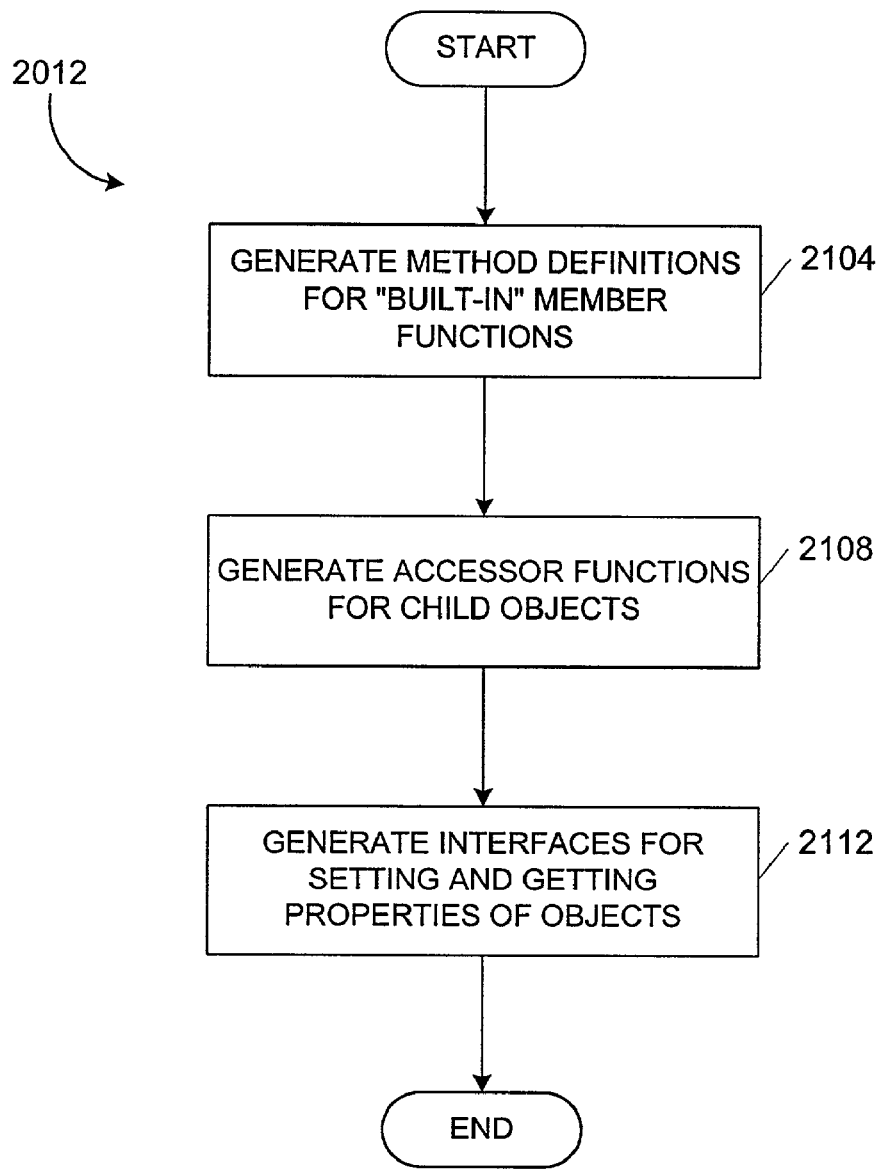
FIG. 21 is a flowchart illustrating a process of generating an interface of the generated component of FIG. 1.

FIG. 21 is a flowchart illustrating a process of generating an interface. FIG. 21 illustrates in further detail the steps that occur in step 2012 of FIG. 20. Depending on the embodiment, additional steps may be added, others removed, and the ordering of the steps rearranged.

Starting at a step 2104, the COM composer 504 generates method definitions for "built-in" member functions. Next, at a step 2108, the COM composer 504 generates accessor function for child objects 2108. For example, the children of the root object includes each of the messages and/or remote function calls. Furthermore, for example, the children of a message object and/or a remote function call object includes one or more payloads that are associated with the object. Moving to a step 2112, the COM composer 504 generates interface for setting and getting properties of objects.

Figure 22:
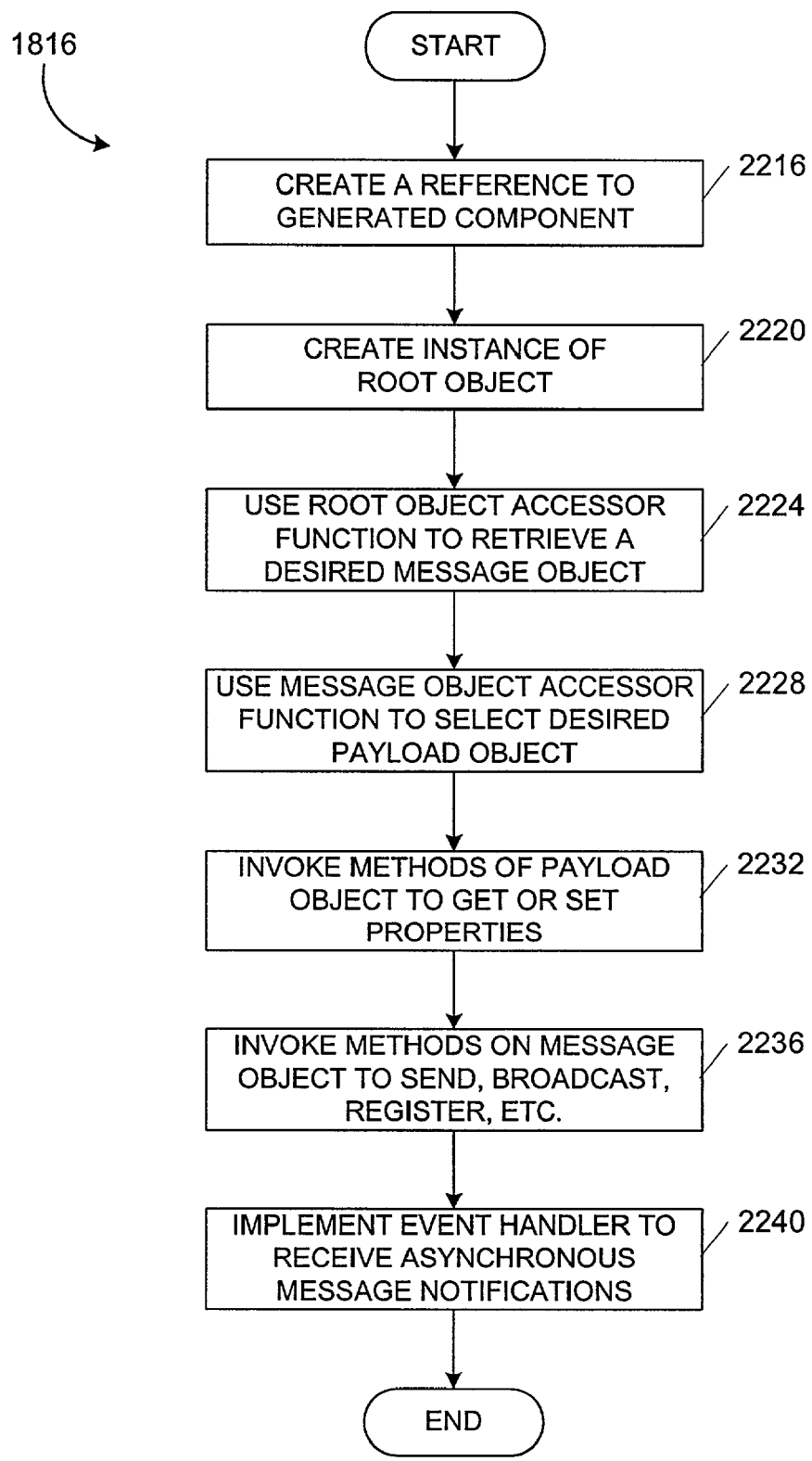
FIG. 22 is a flowchart illustrating a process of using the generated component of FIG. 5 from any COM-compliant language.

FIG. 22 is a flowchart illustrating a process of using the generated component 508. FIG. 22 illustrates in further detail certain steps that occur in step 1816 of FIG. 18. Depending on the embodiment, additional steps may be added, others removed, and the ordering of the steps rearranged.

Before starting at a step 2216, the user has opened a COM development environment and located the via the COM development environment the generated component 508.

Starting at the step 2216, the user creates a reference to the generated component 508. Next, at a step 2220, the user creates an instance of the root object. Moving to a step 2224, the user can use the root object accessor function to retrieve a desired message object or remote function call object. Continuing to a step 2228, the user can use the accessor function of the object to select a desired payload object.

Proceeding to a step 2232, the user invokes a method of the payload object to get or set properties of the payload object. For, example, the user can store data in the payload object. Next, at a step 2236, the user invokes methods on the message object or the remote function call object to send a communication. The user may also invoke other methods on a message object such as register the message such any broadcast on the message is received by the invoking process. Other methods are described above with reference to FIG. 5. Next, at a step 2240, the user implements an event handler to receive asynchronous communications that are received, if any.

Figure 23:
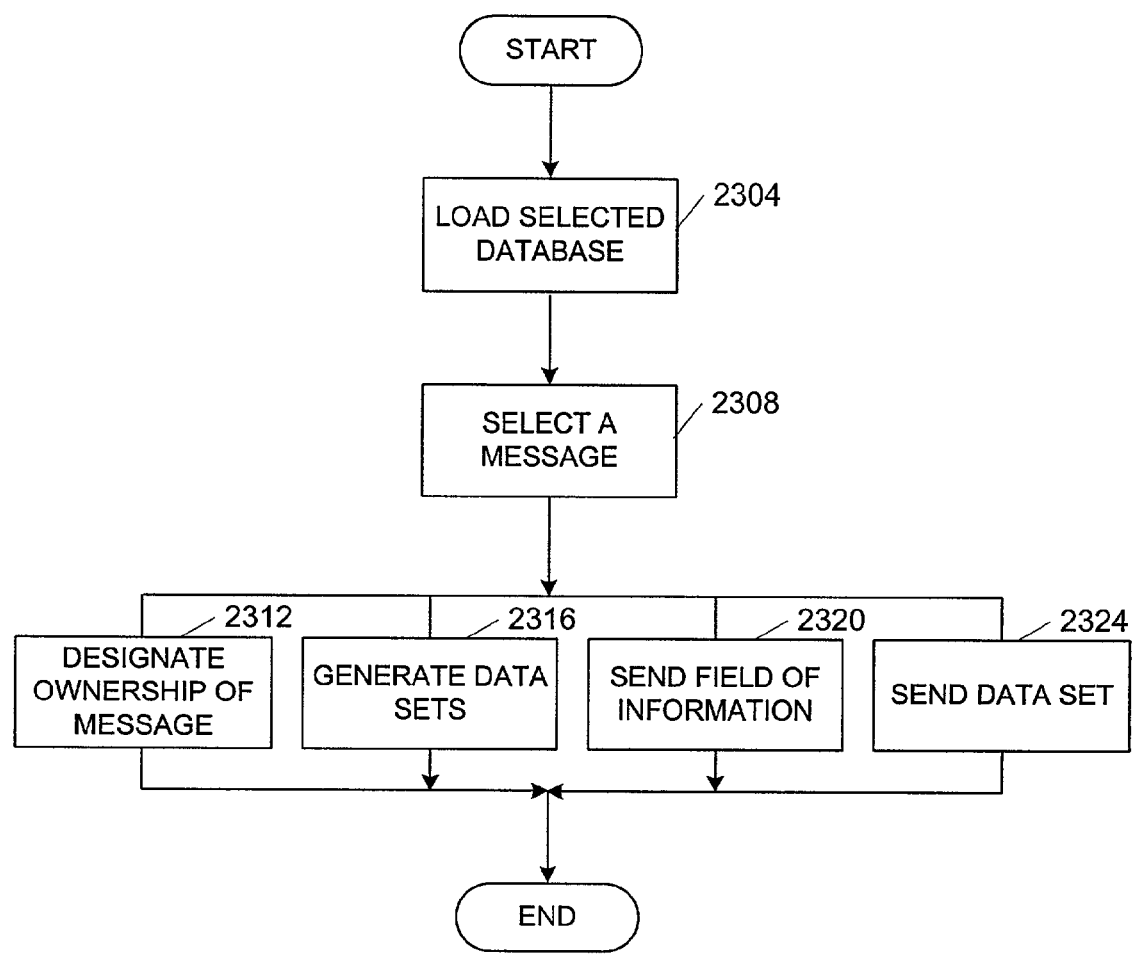
FIG. 23 is a flowchart illustrating a process of testing one of the communication interfaces that is identified by the communication database of FIG. 1.

FIG. 23 is a flowchart illustrating a process of using the studio module 128. The studio module 128 provides a graphical user interface control panel for testing each of the communication interfaces that are identified by the communication database 124. Starting at a step 2304, a user loads a selected communication database 124. A user may have different communication databases for different projects. Once loaded, a user may view and select any of the communication interfaces in the communication database 124. After a is selected, the user can perform a number of functions with respect to the database such as: designating ownership of a communication interface (step 2312), generating a data set (state 2316), sending a field of information (step 2320), and sending a data set (step 2324).

Figure 24:
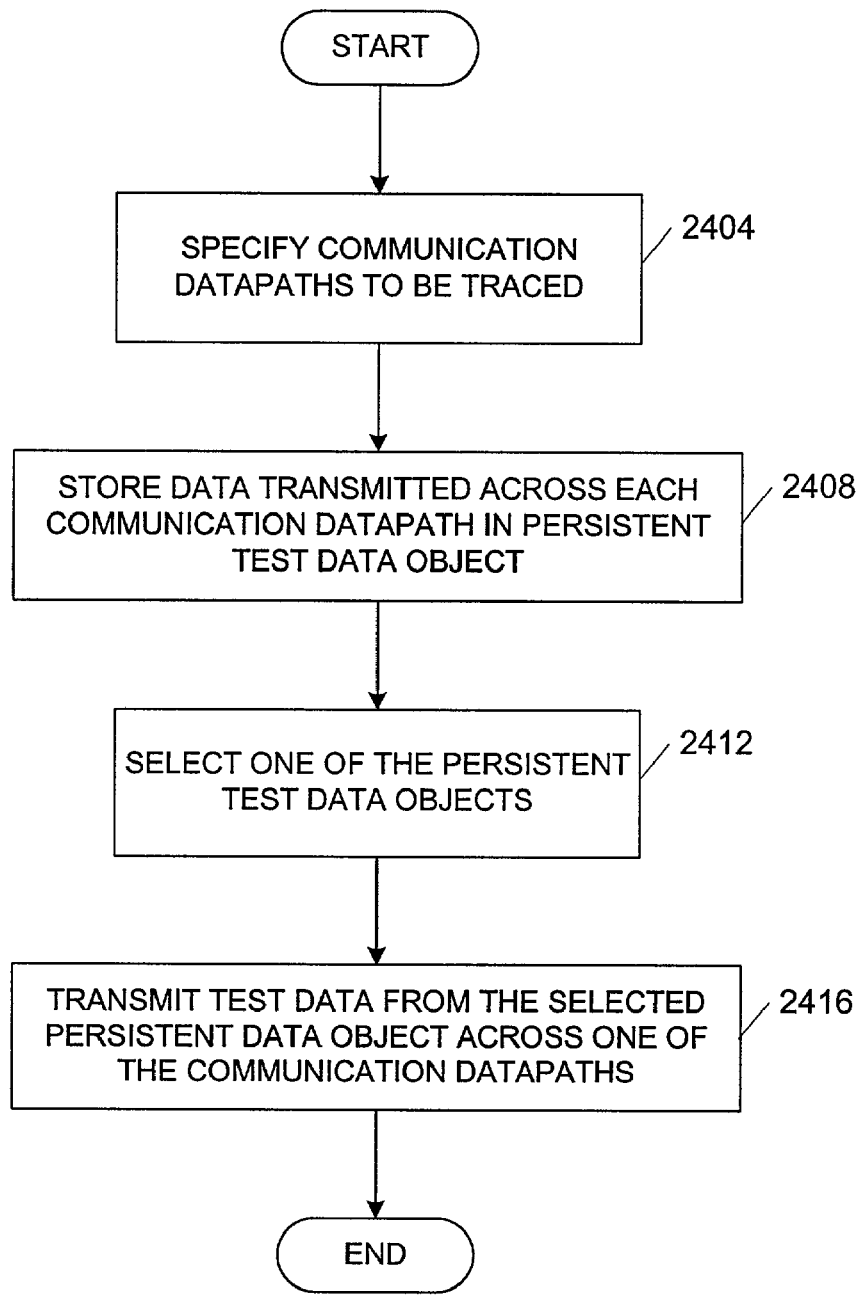
FIG. 24 is a flowchart illustrating a process of generating data sets of information based upon monitoring communications that are transmitted between at least two threads.

FIG. 24 is a flowchart illustrating a process of generating a data set based upon monitoring the communication between two threads executing under the DAT system 100. It is noted that the process of generating a data set can be initiated by a user either: (i) the studio module 128, (ii) C language source code that invokes a method of the host computer communication module 116, (iii) a script executing in the script engine 312, or (iv) a COM-compliant application via the generated component 508.

Starting at a step 2404, the user specifies the communication data paths that are to be traced. For example, the DAT system 100 can trace that data is sent via a message or via a remote function call.

Next, at a step 2408, the DAT system 100 monitors and stores the data that is transmitted across each of the designated communication paths. In one embodiment of the invention, the data is stored in a persistent test data object. Proceeding to a step 2412, any thread can then select and retrieve the contents of any of persistent test data objects and use the data for testing. Continuing to a step 2416, one of the threads of the DAT system 100 uses one of the persistent data object to transmit data from one of the selected persistent data object across one of the communication data paths.

Figure 25:
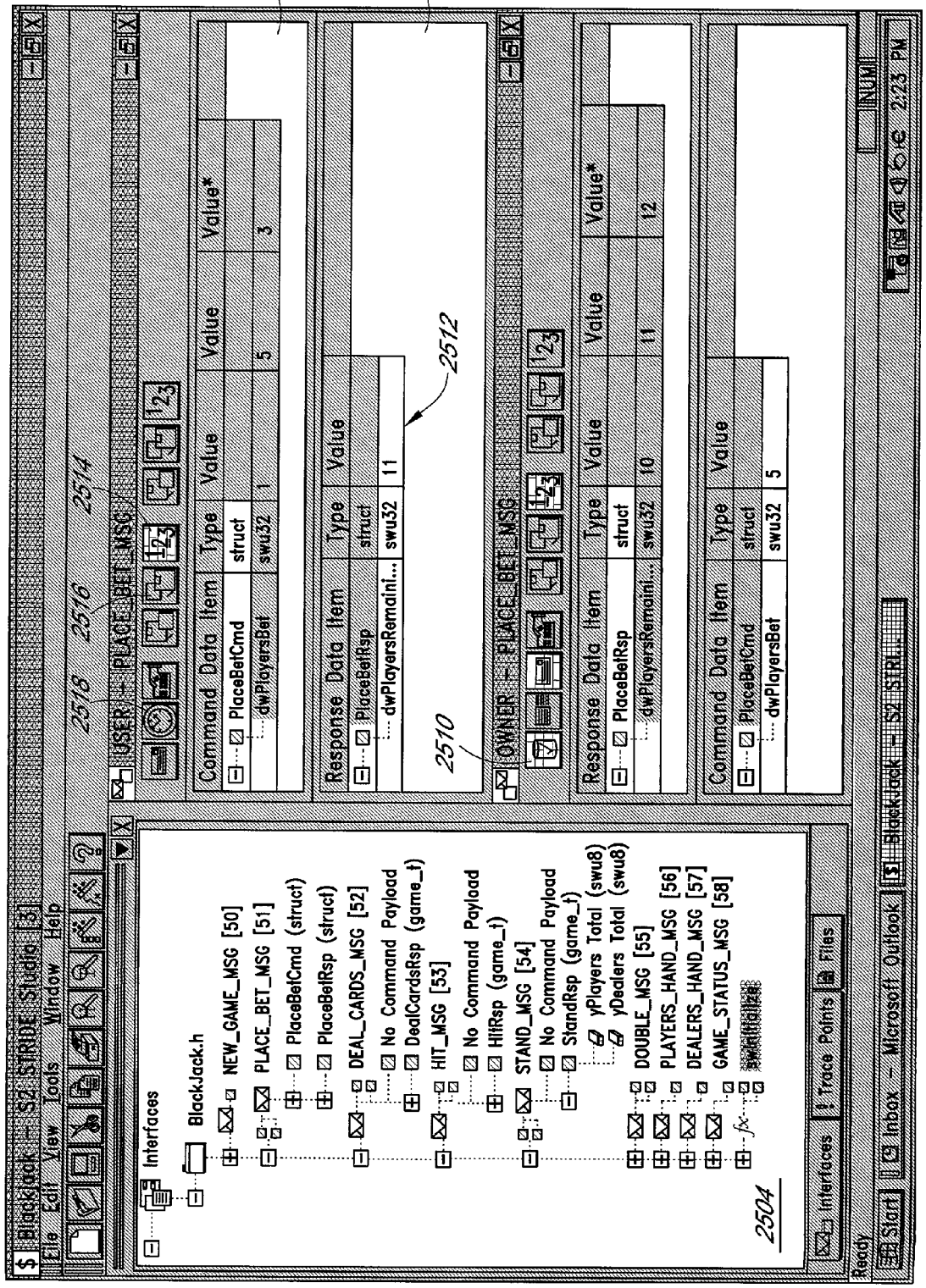
FIG. 25 is an exemplary user interface for testing messages.

FIG. 25 illustrates an exemplary user interface 2500 that is provided by the studio module 128. The user interface 2500 includes an interface window 2504 that lists all of the interfaces that are maintained in the communication database 124. Each entry in the in the interface list is selectable by a user. In response to user selection, a communication window 2508 is displayed on the screen. The communication window 2508 includes an register icon 2510 that allows a user to register ownership of a message or remote function call. In one embodiment, if a message is a two-way message, the communication window is divided into a command window 2508 and a response window 2510. The command window and the response window include one or more data set fields 2512. The number of data set fields is configurable by the user. The data sets show the contents of the most recent payload and a user configurable number of previously received payloads.

Using the data set fields 2512, the user can build a payload for a particular command message and set the payload of the response message. Furthermore, the user can select a "store data set" icon 2514 to store the values in the data set fields 2512 in the communication database 124. Later, the user can select a "load data set" icon 2516 to load the stored values. Furthermore, the user may select a clock icon 2518 to have the studio module 128 automatically iterate and transmit the data values in sequence at a user configurable time interval.

Figure 26:
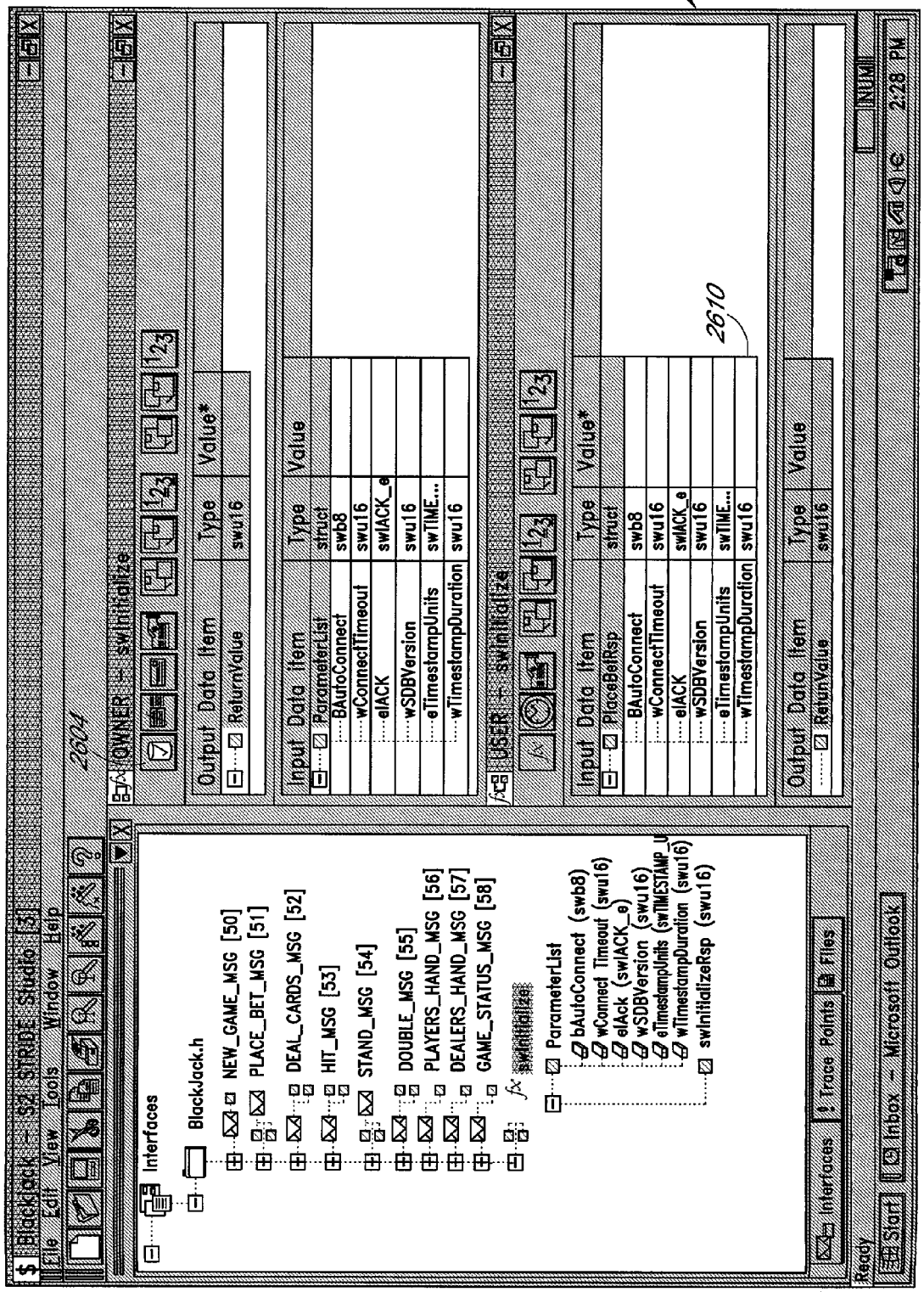
FIG. 26 is an exemplary user interface for testing remote function calls.

FIG. 26 illustrates an exemplary user interface 2600 that allows a user to view and test the parameters that are transmitted as part of a function call. Using a register icon, a user can register ownership of a function. A user window 2608 displays a plurality of parameter fields 2610 that allow a user to set the values of parameters in the function. An owner window 2610 displays the parameters that have been passed to the function. The user interface 2600 allows the saving and loading of data sets as described above with reference to FIG. 25.

Figure 27:
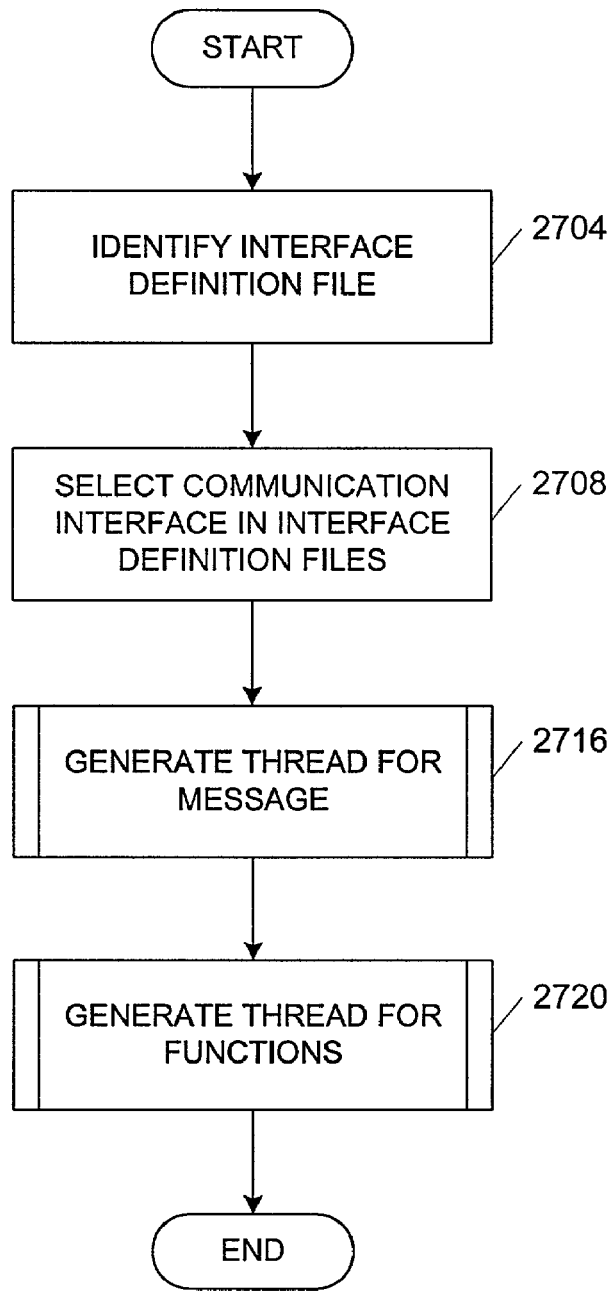
FIG. 27 is a flowchart illustrating a process of generating template code for use with the development and testing system of FIG. 1.

FIG. 27 is a flowchart illustrating a process of automatically generating templates of source code for use with the embedded computer communication module 112 or the host computer communication module 116. In one embodiment of the invention, the process of FIG. 27 is performed by the studio module 128. In another embodiment of the invention, the process of FIG. 37 is performed by a standalone tool, such as a code generator. For convenience of description, the following description refers to a code generator. However, it is to be appreciated that such function could be provided by the studio module 128 or the communication database 124. Depending on the embodiment, additional steps may be added, others removed, and the ordering of the steps rearranged.

Starting at a step 2704, the user identifies one or more interface definition files that define the communication interface. For example, in code block 3200 of FIG. 32 illustrates a portion of an interface definition file.

Continuing to a step 2708, the user selects one or more of the communication interfaces in the selected interface definition files. In one embodiment of the invention, a code generator provides a graphical user interface utility for selection of the communication interfaces.

Next, at a step 2716, a code template of a "thread" is generated for handling each of selected messages in the interface definition file. An exemplary process of generating a thread is described below with reference to FIG. 28. An exemplary template is shown in code block 3204 of FIG. 32.

Moving to a step 2720, a template of a thread is generated for each of the selected functions in the interface definition file. An exemplary process of generating a thread is described below with reference to FIG. 31. An exemplary template is shown in code block 3204 of FIG. 32.

Figure 28:
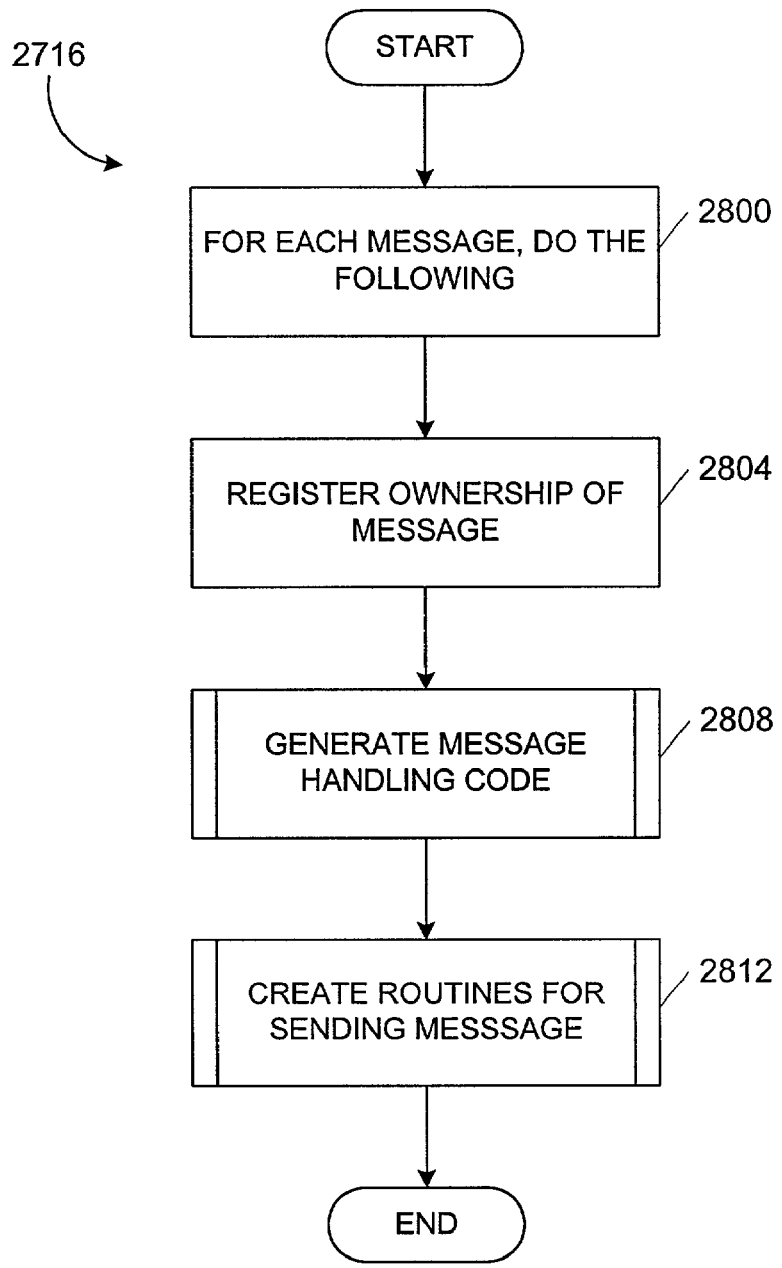
FIG. 28 is a flowchart illustrating a process of generating code for handling a message that is defined by a predefined communication interface.

FIG. 28 is a flowchart illustrating a process of generating a thread for each of the identified messages in an interface definition file. FIG. 28 illustrates in further detail the steps that occur in step 2716 of FIG. 27. Depending on the embodiment, additional steps may be added, others removed, and the ordering of the steps rearranged.

Before starting at a step 2800, a message handling routine is created to handle all messages that have been identified by the user. The message handling routine includes a loop and, subsequent to the loop, a switch statement. See e.g., code block 3204. Starting at a step 2800, a loop is entered and steps 2804, 2808, and 2812 are performed for each of the identified messages. Continuing to a step 2804, the code generator adds a line of code to register each of the messages. See e.g., code block 3204. In one embodiment of the invention, the source code includes code to invoke a registration routine that is provided by the embedded computer communication module 112 or the host computer communication module 116. The call to invoke the registration route is placed prior to the generated switch statement.

Next, at a step 2808, the code generator generates message handling code for each of identified messages. An exemplary process of generating message handling code is described below with reference to FIG. 29. Continuing to a step 2812, the code generator creates routines for sending a message. An exemplary process of creating a routing for sending a message is described below with reference to FIG. 30.

Figure 29:
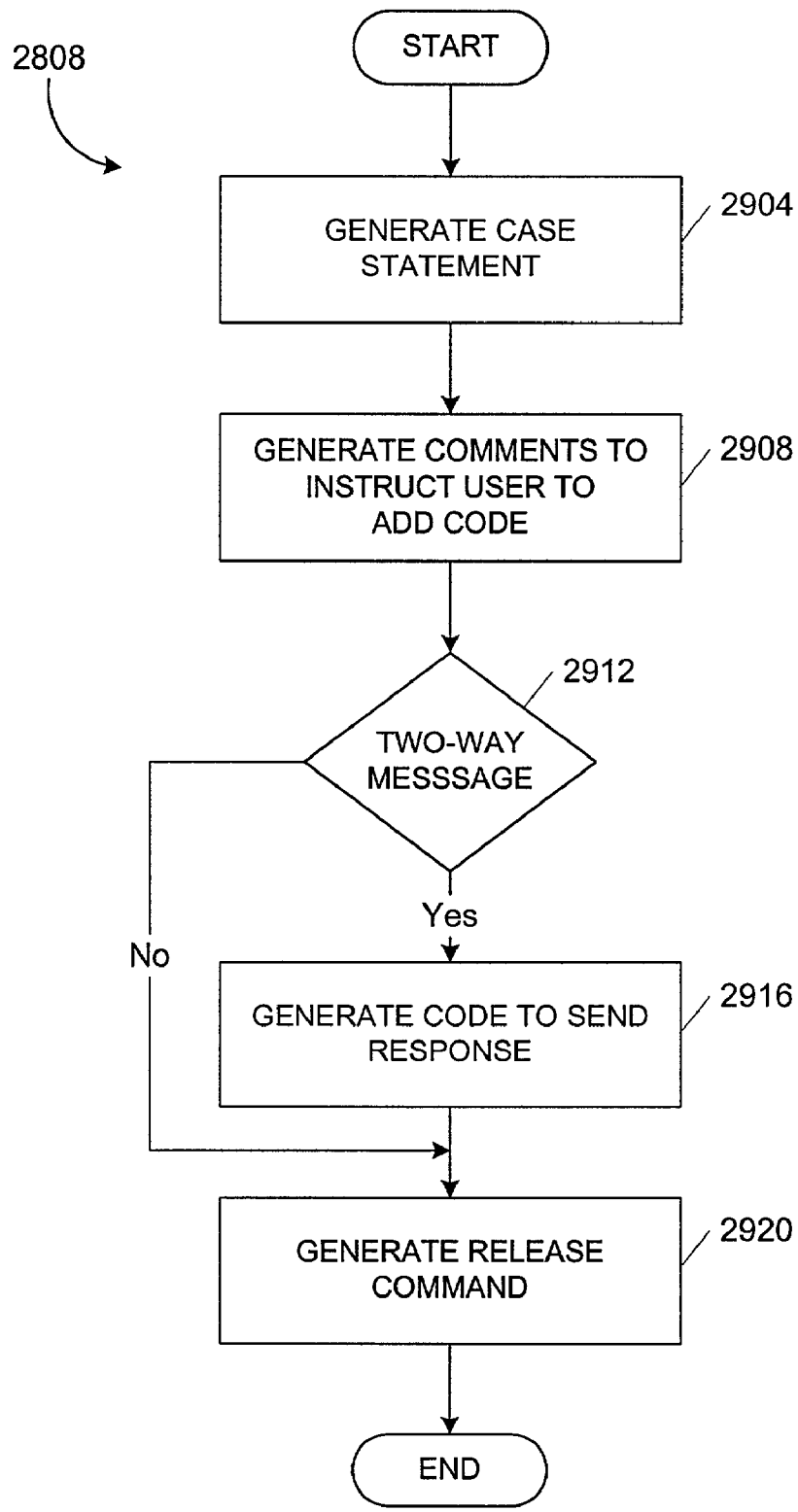
FIG. 29 is a flowchart illustrating a process of generating message handling code.

FIG. 29 is a flowchart illustrating a process of generating message handling code. FIG. 29 illustrates in further detail the steps that occur in step 2908 of FIG. 28. Depending on the embodiment, additional steps may be added, others removed, and the ordering of the steps rearranged. The process shown in FIG. 29 is performed with respect to each of the messages identified by the user in step 2708 of FIG. 27.

Starting at a step 2904, the code generator generates a case statement. Proceeding to a step 2908, the code generator generates a comment to the user to instruct the user to add code.

Proceeding to a decision step 2912, the code generator determines whether the message is "two-way". If the message is "two-way", the process proceeds to a step 2916. Otherwise, the process proceeds to a step 2920.

At the step 2916, the code generator adds code in the generated case statement to invoke a send response routine. As an example, code block 3204 of FIG. 32 includes a call to the "SendMesessageTwoWayResponse" routine. The process of generating a response routine, such as the "SendMesessageTwoWayResponse" routine, is described below with reference to 3016 of FIG. 30. In one embodiment of the invention, the generated code will invoke an API, e.g., SendResponse( ), of the DAT system 100. At this step, the code generator may also generate other APIs for convenience of the user, e.g., routines to setup and attach pointers. Moving to a step 2920, the code generator may also generate code to invoke a release routine that is provided by the API.

Figure 30:
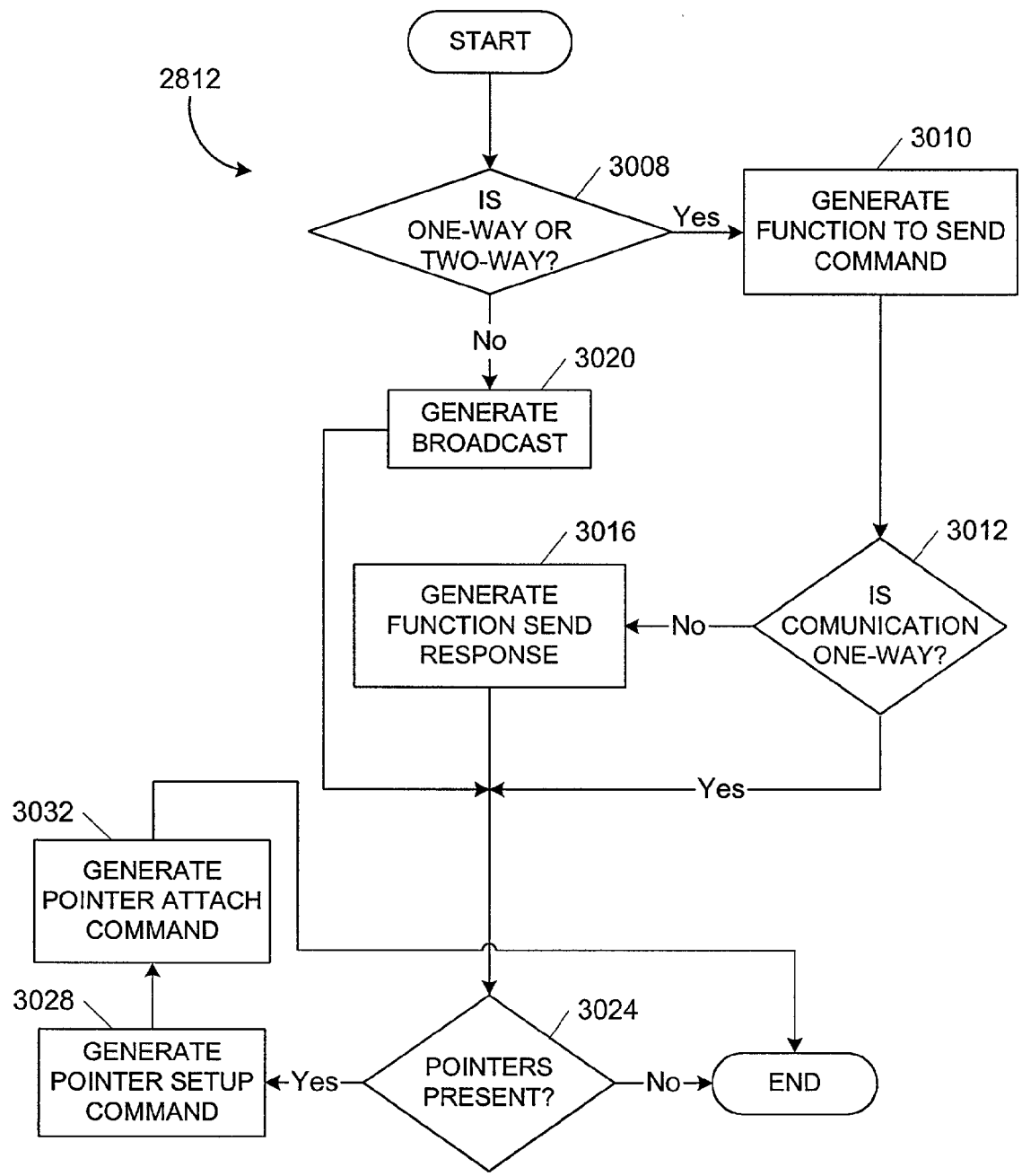
FIG. 30 is a flowchart illustrating a process of generating code to send a message to a predefined communication interface.

FIG. 30 is a flowchart illustrating a process of generating a template of a routine for sending a message via the communication interface identified by the user in step 2708 of FIG. 27. FIG. 30 illustrates in further detail the steps that occur in step 2812 of FIG. 28. Starting at a step 3008, the code generator determines whether the message is one-way, two-way, or broadcast. If the message is one-way or two-way, the process proceeds to a step 3010. At the step 3010, the code generator generates a function to send a command to invoke a send command. An exemplary generated code template is shown in code block 3208 of FIG. 32. Continuing to a decision step 3012, the code generator determines whether the communication is one-way or two-way. If the message is not one-way, i.e., two-way, the process proceeds to a step 3016. At the step 3016, the code generates a function for sending a response. The generated code invokes the API to send a response.

Referring again to the decision step 3008, the code generator determines whether message is a broadcast message. If the message is a broadcast, the process proceeds to a step 3020. At the step 3020, the code generator adds code to invoke an broadcast routine that is part of the API of the embedded computer communication module 112 and the host computer communication module 116. From steps 3012 (if the communication is "one-way"), 3020, and 3016 the process proceeds to a step 3024. At the step 3024, the code generator determines whether there are pointers present in the payload of the message. If pointers are present, the process proceeds to a step 3028. At the step 3028, the code generator generates code to invoke a pointer setup command that is part of the communication library API. Next, at a step 3032, the code generator generates code to invoke the API attach pointer. It is noted that the generated commands during steps 3032 and 3028 are inserted into the generated code prior to the generated send response command (step 3016).

Figure 31:
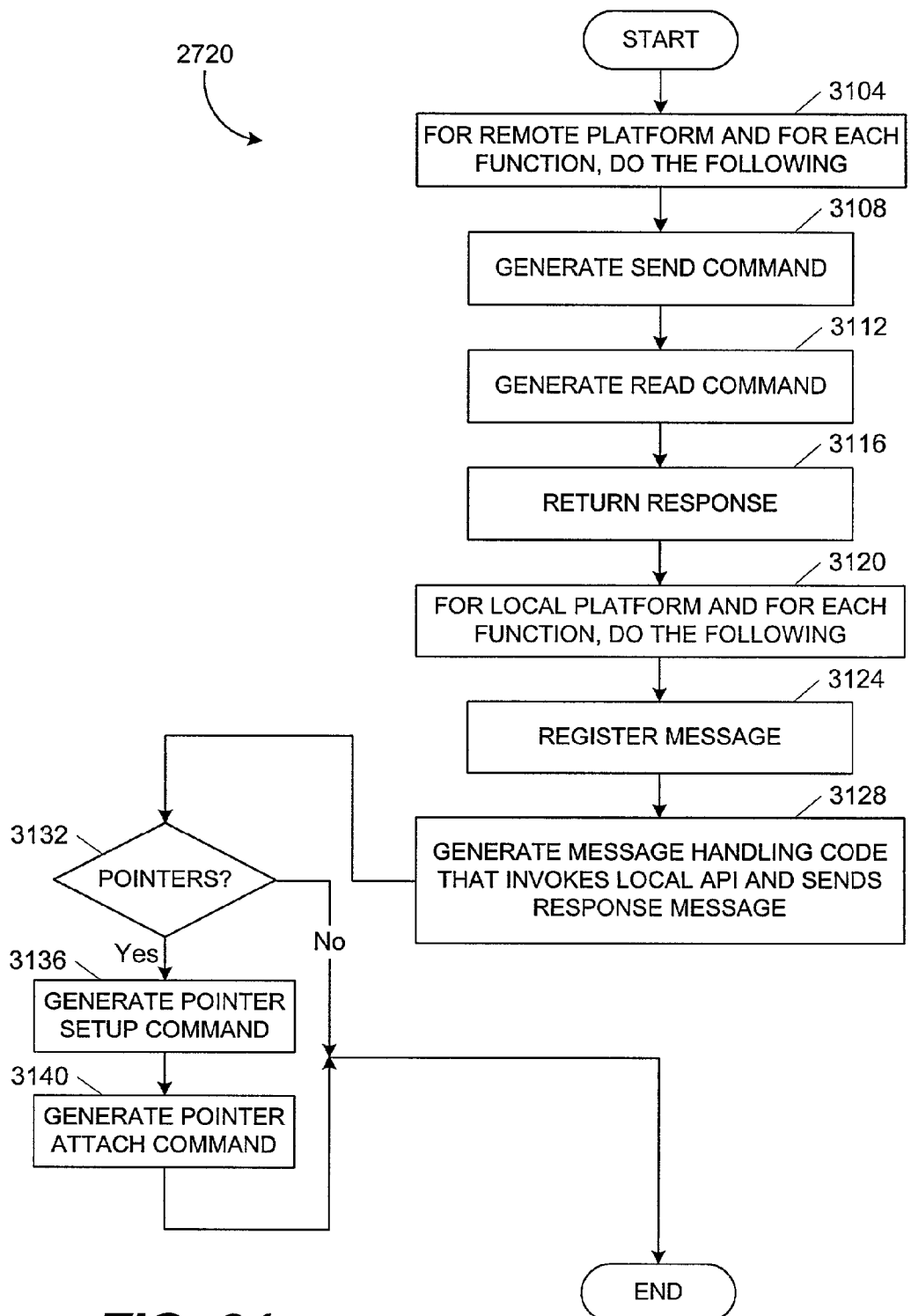
FIG. 31 is a flowchart illustrating a process of generating code for handling inter-platform messaging in response to a function call.

FIG. 31 is a flowchart illustrating a process of generating template code for communicating across platforms via a remote function call. In one embodiment of the invention, inter-platform function calls invoke a local function that communicates with the remote function of the same name via messaging that is provided by the embedded computer communication module 112 and the host computer communication module 116.

Depending on the embodiment, additional steps may be added, others removed, and the ordering of the steps rearranged. Starting at a step 3104 a loop is performed with respect to steps 3108, 3112, and 3116. In the loop, template code is generated for exestuation on a local platform, i.e., either the embedded computer 104 or the host computer 108. The local platform in this context is defined to be the computer that does not have the routine that is to be invoked. Steps 3108, 3112, and 3116 are performed with respect to each of the functions identified by the user in step 2708 of FIG. 27. At the step 3108, the code generator generates a send command. Next, at a step 3112, the code generated generates a read command. Proceeding to a step 3116, the code generator generates code to return a response. An exemplary code block resulting from steps 3108, 3112, and 3116 is shown in code block 3212 of FIG. 33.

Next, at a step 3120, a loop is performed with respect to steps 3124, 3128, 3132, 3136, and 3140. In this loop, template code is generated for execution on the remote platform. Proceeding to a step 3124, the code generator generates code to invoke a registration routine of the API. Moving to a step 3128, the code generator generates code that invokes the local API that was requested by the thread on the other platform and sends a response message. An exemplary code block resulting from steps 3124, 3218, 31332, 3136, and 3140 is shown in code block 3214.

Next, at a decision step 3132, the code generator determines whether there are any pointers in the parameters of the function. If there are no pointers in the parameters of the function, the process ends. However, if there are pointers, the process proceeds to a step 3136 and the code generator generates code to invoke the API to setup a pointer. Moving to a step 3140, the code generator generates code to invoke the API to attach a pointer. The process then ends.

The DAT system 100 provides a single virtual environment that enables threads to be located on different platforms and still seamlessly communicate with each other. The DAT system 100 provides communication interoperability between the two platforms by automatically transforming the data depending on the machine characteristics of the embedded computer 104, the host computer 108, and the communication interfaces that are stored in the communication database 124. The DAT system 100 provides automatic and seamless access to the message-based and remote function call interfaces designed into the embedded computer's software application. The DAT system 100 automatically extracts interface information and builds a database of messaging and remote function call information.

Using the studio module 128, a user has complete visibility and control of the embedded application's interfaces without having to address the following issues: (i) updates to a desktop tool to accommodate new messages; (ii) updates to the embedded software to support the desktop tool's new functionality; (iii) what target compiler is used; (iv) what RTOS is used; and (iv) what platform the thread(s) are executing on. The DAT system 100 allows seamless access to interfaces stored in the communication database 124 via scripting languages or any COM-compliant application.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

We claim:

1. A system for testing a routine executing on an embedded computer, the system comprising:
   a host computer;
   an embedded computer executing a routine, wherein the embedded computer monitors a plurality of communications that are sent to the routine by other routines that are within the same thread as the monitored routine and that are executing on the same embedded computer as the monitored routine, and wherein the embedded computer transmits data from the monitored communications to the host computer, wherein the host computer stores the data from the monitored communications in a plurality of persistent data sets, thereby facilitating testing of the routine on the embedded computer using the data sets by re-transmission, wherein the host computer is configured to re-transmit at least one of the data sets to the monitored routine on the embedded computer, and wherein the host computer is configured to provide an interface for threads executing on the host computer to load and store monitored data in the persistent data sets, such that the threads executing on the host computer can selectively retrieve at least one data set that is stored on the host computer and re-transmit the at least one data set to the monitored routine on the embedded computer.

2. A method of testing a routine, the method comprising:
   monitoring a plurality of communications that are sent to a routine that is executing on an embedded computer by other routines that are within the same thread as the monitored routine and that are executing on the same embedded computer as the monitored routine, the communications including parameter data for the routine;
   transmitting the monitored communications to a host computer;
   storing the monitored communications in a plurality of persistent data sets, thereby facilitating testing of the routine on the embedded computer using the data sets by re-transmission, wherein the host computer is configured to provide an interface for threads executing on the host computer to load and store monitored data in the persistent data sets, such that the threads executing on the host computer can selectively retrieve at least one data set that is stored on the host computer and re-transmit the at least one data set to the monitored routine on the embedded computer; and
   transmitting at least one of the data sets to the monitored routine on the embedded computer.

3. The method of claim 2, wherein the host computer modifies the byte order of parameter data based upon the machine characteristics of the host computer and the embedded computer.

4. The method of claim 2, wherein the host computer modifies the size of data types of parameter data based upon the machine characteristics of the host computer and the embedded computer.

5. The method of claim 2, wherein the host computer adjusts the alignment of data structures in parameter data according to requirements of the embedded computer based upon the machine characteristics of the host computer and the embedded computer.

6. The method of claim 2, the method additionally comprising receiving a user request to store data in at least one of the persistent data sets.

7. A system for testing a routine, the system comprising:
   means for monitoring a plurality of communications that are sent to a routine that is executing on an embedded computer by other routines that are within the same thread as the monitored routine and that are executing on the same embedded computer as the monitored routine, the communications including parameter data for the routine;
   means for transmitting the monitored communications to a host computer;
   means for storing the monitored communication in a plurality of persistent data sets, thereby facilitating testing of the routine on the embedded computer using the data sets by re-transmission, wherein the host computer is configured to provide an interface for threads executing on the host computer to load and store monitored data in the persistent data sets, such that the threads executing on the host computer can selectively retrieve at least one data set that is stored on the host computer and re-transmit the at least one data set to the monitored routine on the embedded computer; and
   means for transmitting the data sets to the monitored routine on the embedded computer.

8. The system of claim 7, wherein the host computer modifies the byte order of parameter data based upon the machine characteristics of the host computer and the embedded computer.

9. The system of claim 7, wherein the host computer modifies the size of data types of parameter data based upon the machine characteristics of the host computer and the embedded computer.

10. The system of claim 7, wherein the host computer adjusts the alignment of data structures in parameter data according to requirements of the embedded computer based upon the machine characteristics of the host computer and the embedded computer.

11. The system of claim 7, the system additionally comprising a graphical icon for loading the data set.

12. The system of claim 7, the system additionally comprising a graphical icon for saving the data set.

13. A method of testing a routine, the method comprising:
monitoring a plurality of communications from a first routine to a second routine that is within the same thread as the first routine, wherein the communication comprises a plurality of data elements including parameter data for the routine;
transmitting the monitored communications to a host computer and storing each of the communications in a persistent data set, thereby facilitating testing of the routine on the embedded computer using the data sets by re-transmission, wherein the host computer is configured to provide an interface for threads executing on the host computer to load and store monitored data in the persistent data sets, such that the threads executing on the host computer can selectively retrieve at least one data set that is stored on the host computer and re-transmit the at least one data set to the monitored routine on the embedded computer; and
transmitting each of the stored data elements to the first routine.

14. The method of claim 13, wherein the host computer modifies the byte order of parameter data based upon the machine characteristics of the host computer and the embedded computer.

15. The method of claim 13, wherein the host computer modifies the size of data types of parameter data based upon the machine characteristics of the host computer and the embedded computer.

16. The method of claim 13, wherein the host computer adjusts the alignment of data structures in parameter data according to requirements of the embedded computer based upon the machine characteristics of the host computer and the embedded computer.

17. The method of claim 13, wherein the first routine and the second routine are each executing on the same embedded computer.

18. A system for testing a routine, the system comprising:
means for monitoring a plurality of communications from a first routine executing on an embedded computer to a second routine executing on a host computer, wherein the communications comprise a plurality of data elements including parameter data for the routine;
means for storing each of the data elements in a persistent data set, thereby facilitating testing of the routine on the embedded computer using the data sets by re-transmission, wherein the host computer is configured to provide an interface for threads executing on the host computer to load and store monitored data in the persistent data sets, such that the threads executing on the host computer can selectively retrieve at least one data set that is stored on the host computer and re-transmit the at least one data set to the monitored routine on the embedded computer; and
means for transmitting at least one of the stored data elements to the first routine.

19. The method of claim 13, the method additionally comprising receiving a user request to store data in at least one of the persistent data sets.

20. The system of claim 18, wherein the host computer modifies the byte order of parameter data based upon the machine characteristics of the host computer and the embedded computer.

21. The system of claim 18, wherein the host computer modifies the size of data types of parameter data based upon the machine characteristics of the host computer and the embedded computer.

22. The system of claim 18, wherein the host computer adjusts the alignment of data structures in parameter data according to requirements of the embedded computer based upon the machine characteristics of the host computer and the embedded computer.

23. The system of claim 18, the system additionally comprising a graphical icon for loading the data set.

24. The system of claim 18, the system additionally comprising a graphical icon for saving the data set.

* * * * *

UNITED STATES PATENT AND TRADEMARK OFFICE
CERTIFICATE OF CORRECTION

PATENT NO. : 7,237,230 B2
APPLICATION NO. : 10/105069
DATED : June 26, 2007
INVENTOR(S) : Mark Underseth, Kirk Fertitta and Robert Howell It is certified that error appears in the above-identified patent and that said Letters Patent is hereby corrected as shown below:

At Page 2, Column 2, Line 26, please delete "Distruited" and insert --Distributed-- therefore;
At Sheet 34 of 39, Figure 28, Reference Number 2812, Line 2, please delete "MESSSAGE" and insert --MESSAGE-- therefore;
At Sheet 35 of 39, Figure 29, Reference Number 2912, Line 2, please delete "MESSSAGE" and insert --MESSAGE-- therefore;
At Sheet 36 of 39, Figure 30, Reference Number 3012, Line 2, please delete "COMUNICATION" and insert --COMMUNICATION-- therefore;
At Column 1, Line 9, please delete "60,278,212" and insert --60/278,212-- therefore;
At Column 7, Line 54, please delete "pragmas" and insert --programs-- therefore;
At Column 10, Line 62-63, please delete "two way" and insert --two-way-- therefore;
At Column 14, Line 9, please delete "one way" and insert --one-way--therefore;
At Column 14, Line 14, please delete "two way" and insert --two-way-- therefore;
At Column 15, Line 55, before "different", please delete "an" and insert --a-- therefore;
At Column 20, Line 29, before "routine", please delete "an" and insert --a-- therefore;
At Column 21, approximately Line 33, after "with", please delete "a" and insert --an-- therefore;
At Column 23, approximately Line 49-50, please delete "COM compliant" and insert --COM-compliant-- therefore;
At Column 23, approximately Line 51, after "test", please delete "a" and insert --an-- therefore;
At Column 26, Line 16, before "register", please delete "an" and insert --a-- therefore;

UNITED STATES PATENT AND TRADEMARK OFFICE
CERTIFICATE OF CORRECTION

| | |
|---|---|
| PATENT NO. | : 7,237,230 B2 |
| APPLICATION NO. | : 10/105069 |
| DATED | : June 26, 2007 |
| INVENTOR(S) | : Mark Underseth, Kirk Fertitta and Robert Howell |

It is certified that error appears in the above-identified patent and that said Letters Patent is hereby corrected as shown below:

At Column 28, Line 22, after "invoke", please delete "an" and insert --a-- therefore.

Signed and Sealed this

Twenty-seventh Day of November, 2007

JON W. DUDAS
*Director of the United States Patent and Trademark Office*